United States Patent
Liu et al.

(10) Patent No.: US 12,238,666 B2
(45) Date of Patent: Feb. 25, 2025

(54) ELECTRONIC DEVICE, WIRELESS COMMUNICATION METHOD, AND COMPUTER-READABLE STORAGE MEDIUM

(71) Applicant: Sony Group Corporation, Tokyo (JP)

(72) Inventors: Min Liu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 343 days.

(21) Appl. No.: 17/633,958

(22) PCT Filed: Aug. 7, 2020

(86) PCT No.: PCT/CN2020/107691
§ 371 (c)(1),
(2) Date: Feb. 9, 2022

(87) PCT Pub. No.: WO2021/031882
PCT Pub. Date: Feb. 25, 2021

(65) Prior Publication Data
US 2022/0346049 A1    Oct. 27, 2022

(30) Foreign Application Priority Data
Aug. 16, 2019 (CN) .......................... 201910758886.9

(51) Int. Cl.
H04W 56/00    (2009.01)
H04L 1/1812   (2023.01)
H04L 5/00     (2006.01)

(52) U.S. Cl.
CPC ....... *H04W 56/0045* (2013.01); *H04L 1/1812* (2013.01); *H04L 5/0053* (2013.01); *H04W 56/001* (2013.01)

(58) Field of Classification Search
CPC ............ H04W 56/0045; H04W 56/001; H04L 1/1812; H04L 5/0053; H04L 1/1825; H04L 1/1822; H04L 1/1896
See application file for complete search history.

(56) References Cited

U.S. PATENT DOCUMENTS

| | | | |
|---|---|---|---|
| 2016/0270071 A1 | 9/2016 | Dinan | |
| 2018/0131431 A1 | 5/2018 | Dinan | |
| 2018/0167172 A1 | 6/2018 | Hosseini et al. | |
| 2021/0391952 A1* | 12/2021 | Hofström | H04L 1/1864 |

FOREIGN PATENT DOCUMENTS

| | | |
|---|---|---|
| CN | 106160973 A | 11/2016 |
| CN | 106304328 A | 1/2017 |

(Continued)

OTHER PUBLICATIONS

International Search Report and Written Opinion mailed on Nov. 11, 2020, received for PCT Application PCT/CN2020/107691, Filed on Aug. 7, 2020, 10 pages including English Translation.

(Continued)

*Primary Examiner* — Mandish K Randhawa
(74) *Attorney, Agent, or Firm* — XSENSUS LLP

(57) ABSTRACT

The present application relates to an electronic device, a wireless communication method, and a computer-readable storage medium. The electronic device according to the present application comprises a processing circuit which is configured to: receive information related to a timing advanced group (TAG) from a network side device serving for the electronic device; and start or end an HARQ process between the electronic device and all cells in the TAG according to the information related to the TAG. By using the electronic device, the wireless communication method, and the computer-readable storage medium according to the present application, the HARQ process can be reasonably started/ended in a unit of the TAG.

15 Claims, 10 Drawing Sheets

(56) References Cited

FOREIGN PATENT DOCUMENTS

| CN | 109845377 | A | 6/2019 |
|---|---|---|---|
| CN | 109964514 | A | 7/2019 |
| CN | 110024457 | A | 7/2019 |
| EP | 2676475 | A2 | 12/2013 |
| EP | 4017068 | A1 | 6/2022 |
| IN | 201637040813 | A | 4/2017 |
| JP | 2015515191 | A | 5/2015 |
| JP | 2017511651 | A | 4/2017 |
| WO | 2013/097212 | A1 | 7/2013 |
| WO | WO-2017024659 | A1 | 2/2017 |
| WO | WO-2018031704 | A1 | 2/2018 |
| WO | WO-2019029589 | A1 | 2/2019 |

OTHER PUBLICATIONS

ZTE Corporation et al., "Impact of HARQ on Random Access Procedure", 3GPP TSG RAN WG2 Meeting #106, R2-1906116, May 13-17, 2019, 4 pages.

Ericsson, "Guard Period for Low Complexity UE in Half-Duplex FDD", 3GPP TSG-RAN WG1 Meeting #77, R1-142373, May 19-23, 2014, 6 pages.

Nokia et al: "Overview for NR supporting NTN", 3GPP Draft; R1-1901722, 3rd Generation Partnership Project (3GPP), Mobile Competence Centre ; 650,Route Des Lucioles ; F-06921 Sophia-Antipolis Cedex ; France, vol. RAN WG1, No. Athens, Greece; Feb. 25, 2019-Mar. 1, 2019 Feb. 16, 2019 (Feb. 16, 2019), XP051599418,.

Thales: "NR-NTN: Chap 7.3—NR modifications to support the Non-Terrestrial Network", 3GPP Draft; R1-1807794 TR38.811 Chap 7.3 NR Impacts V10, 3rd Generation Partnership Project (3GPP), Mobile Competence Centre ; 650, Route Des Lucioles ; F-06921 Sophia-Antipolis Cedex ; France, vol. RAN WG1, No. Busan, Korea; May 21, 2018-May 25, 2018 May 29, 2018 (May 29, 2018), XP051463502.

3rd Generation Partnership Project; Technical Specification Group Radio Access Network; NR; Radio Resource Control (RRC) protocol specification (Release 15)[online]Jun. 29, 2019pp. 184, 377-378.

Nokia, Nokia Shanghai BellOverview for NR supporting NTN3GPP TSG RAN WG1 #96 R1-1901722.

* cited by examiner

ELECTRONIC DEVICE, WIRELESS COMMUNICATION METHOD, AND COMPUTER-READABLE STORAGE MEDIUM

CROSS-REFERENCE TO RELATED APPLICATIONS

This application is based on PCT/CN2020/107691 filed on Aug. 7, 2020, which claims priority to Chinese Patent Application No. 201910758886.9, titled "ELECTRONIC DEVICE, WIRELESS COMMUNICATION METHOD, AND COMPUTER-READABLE STORAGE MEDIUM", filed on Aug. 16, 2019 with the China National Intellectual Property Administration, each of which is incorporated herein by reference in its entirety.

FIELD

The present disclosure generally relates to the field of wireless communication, and in particular to an electronic equipment, a wireless communication method, and a computer-readable storage medium. More particularly, the present disclosure relates to an electronic equipment serving as a network side equipment in a wireless communication system, an electronic equipment serving as a user equipment in a wireless communication system, a wireless communication method performed by a network side equipment in a wireless communication system, a wireless communication method performed by a user equipment in a wireless communication system, and a computer-readable storage medium.

BACKGROUND

Hybrid Automatic Repeat Request (HARQ) technology is a combination of forward error correction coding technology and automatic repeat request technology. In a case of successful decoding, a receiver may transmit an ACK signal to a transmitter; and in a case of failed decoding, the receiver may save the received data and transmit an NACK signal to the transmitter to request the transmitter to retransmit data, and the receiver combines the retransmitted data with the previously received data before decoding, thereby achieving a certain diversity gain, reducing the number of times for retransmission, and reducing latency.

In order to improve system efficiency, multiple HARQ processes may be defined in a communication system, where each of the HARQ processes has a unique identifier. While waiting for feedback information of a certain HARQ process, other HARQ processes may be used to transmit data packets. The minimum Round Trip Time (RTT) of HARQ indicates a time period of a complete transmission of a data packet, including a whole process of starting to transmit a data packet from a transmitter, receiving and processing the data packet at a receiver, feeding back an ACK/NACK signal by the receiver based on a processing result, demodulating and processing the ACK/NACK signal by the transmitter to determine whether to retransmit in the next frame or to transmit a new data packet in the next frame. Generally, the number of HARQ processes may be determined based on RTT. However, HARQ is time-sensitive as it is a stop-and-wait protocol. When the RTT between the transmitter and the receiver is large, the number of HARQ processes cannot be increased indefinitely. In this case, although enabling HARQ may increase reliability of the system, it may reduce effectiveness of the system, and thereby degrade system performance.

Therefore, it is required to propose a technical solution which can enable/disable HARQ processes reasonably.

SUMMARY

A general summary of the present disclosure is provided in this section, which is not a comprehensive disclosure of a full scope or all features thereof.

An objective of the present disclosure is to provide an electronic equipment, a wireless communication method and a computer-readable storage medium, in order to enable/disable HARQ processes reasonably.

According to an aspect of the present disclosure, an electronic equipment is provided. The electronic equipment includes processing circuitry configured to: receive, from a network side equipment serving the electronic equipment, information related to a Timing Advance Group (TAG); and enable or disable HARQ processes between the electronic equipment and all cells in the TAG according to the information related to the TAG.

According to another aspect of the present disclosure, an electronic equipment is provided. The electronic equipment includes processing circuitry configured to: generate information related to a Timing Advance Group TAG of a user equipment served by the electronic equipment; and transmit the information to the user equipment to instruct the user equipment to enable or disable HARQ processes between the user equipment and all cells in the TAG.

According to another aspect of the present disclosure, a wireless communication method performed by an electronic equipment is provided. The method includes: receiving, from a network side equipment serving the electronic equipment, information related to a Timing Advance Group TAG; and enabling or disabling HARQ processes between the electronic equipment and all cells in the TAG according to the information related to the TAG.

According to another aspect of the present disclosure, a wireless communication method performed by an electronic equipment is provided. The method includes: generating information related to a Timing Advance Group TAG of a user equipment served by the electronic equipment; and transmitting the information to the user equipment to instruct the user equipment to enable or disable HARQ processes between the user equipment and all cells in the TAG.

According to another aspect of the present disclosure, a computer-readable storage medium including executable computer instructions is provided. The executable computer instructions, when being executed by a computer, cause the computer to perform the wireless communication method according to the present disclosure.

With the electronic equipment, the wireless communication method and the computer-readable storage medium, the electronic equipment may enable or disable HARQ processes between the electronic equipment and all cells in a TAG according to information related to the TAG. In this way, the HARQ processes may be enabled/disabled by the electronic equipment in units of TAGs, which makes enabling and disabling of the HARQ processes more reasonable.

From the description provided herein, further applicability areas will become apparent. The description and specific examples in this summary are for illustrative purposes only, and are not intended to limit the scope of the present disclosure.

BRIEF DESCRIPTION OF THE DRAWINGS

The drawings described herein are for illustrative purposes only of preferred embodiments rather than all possible embodiments, and are not intended to limit the scope of the present disclosure. In the drawings.

Figure 1:
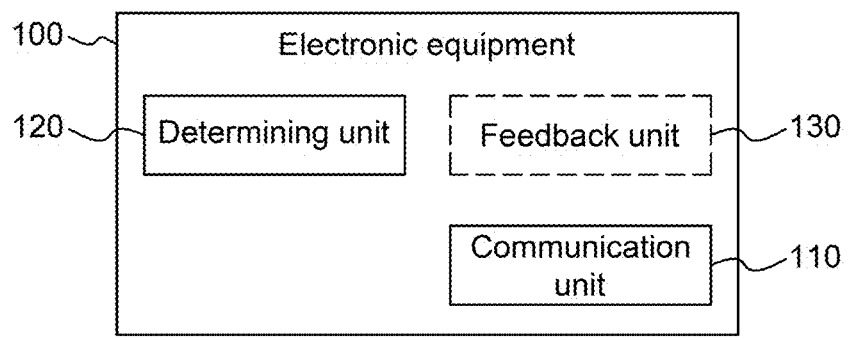
FIG. 1 is a block diagram showing an exemplary configuration of an electronic equipment according to an embodiment of the present disclosure.

Although the present disclosure is susceptible to various modifications and alternative forms, specific embodiments thereof have been shown in the drawings as examples and are described in detail herein. However, it should be understood that the description of specific embodiments herein is not intended to limit the present disclosure to the disclosed specific forms; on the contrary, the purpose of the present disclosure is to cover all modifications, equivalences and replacements that fall within the spirit and scope of the present disclosure. It should be noted that throughout the several drawings, corresponding reference numerals indicate corresponding parts.

DETAILED DESCRIPTION

Examples of the present disclosure are described more adequately with reference to the drawings. The following description is merely exemplary, and is not intended to limit the present disclosure, application, or use.

Example embodiments are provided so that the present disclosure will be thorough and fully convey the scope to those skilled in the art. Numerous specific details such as examples of specific components, devices, and methods are set forth to provide a thorough understanding of the embodiments of the present disclosure. It will be apparent to those skilled in the art that the example embodiments may be implemented in many different forms without using specific details, none of which should be construed as limiting the scope of the present disclosure. In some example embodiments, well-known processes, well-known structures, and well-known technologies are not described in detail.

The description are made in the following order:
1. Description of problems;
2. Configuration example of user equipment;
3. Configuration example of network side equipment;
4. Method embodiments; and
5. Application examples.

1. DESCRIPTION OF PROBLEMS

As mentioned above, the number of HARQ processes may be determined based on RTT. However, HARQ is time-sensitive as it is a stop-and-wait protocol. When the RTT between the transmitter and the receiver is large, the number of HARQ processes cannot be increased indefinitely. In this case, although enabling HARQ may increase reliability of the system, it may reduce effectiveness of the system, and thereby degrade system performance.

This problem is particularly obvious in a wireless communication system including a Non-terrestrial network (NTN). In the NTN, a network side equipment may be located on a satellite equipment, and a user equipment is located on the ground. Therefore, The RTT between the user equipment and the network side equipment is quite large. In this case, enabling HARQ processes without any restriction may significantly degrade performance of the system.

A main function of a Timing Advance (TA) process is to ensure synchronization of an uplink between the user equipment and the network side equipment, that is, to ensure that a signal transmitted by the user equipment can reach the network side equipment at the time specified by the network side equipment. Generally, the greater the distance between the user equipment and the network side equipment, the greater the value of TA, that is, the user equipment should initiate transmission earlier; and the smaller the distance between the user equipment and the network side equipment, the smaller the value of TA. In a case where the user equipment has one or more serving cells, the one or more serving cells of the user equipment are divided into multiple TAGs. For serving cells in a certain TAG, the value of TA between a serving cell and the user equipment is the same as the value of TA between any other serving cell and the user equipment. For example, in a case where the user equipment has three serving cells, assuming that cell 1 and cell 2 belong to TAG1, and cell 3 belongs to TAG2, then the value of TA between cell 1 and the user equipment is equal to the value of TA between cell 2 and the user equipment.

It can be seen that the value of TA can indirectly describe the RTT between the user equipment and the network side equipment. Therefore, the present disclosure is intended to propose an electronic equipment in a wireless communication system, a wireless communication method performed by an electronic equipment in a wireless communication system, and a computer-readable storage medium, which can enable or disable HARQ processes in units of TAGS, so that an enabling and disabling process of the HARQ processes becomes more reasonable.

The wireless communication system according to the present disclosure may include an NTN and/or a Terrestrial network (TN). In the wireless communication system including the NTN and TN, the user equipment may be connected to the NTN and/or TN. The network side equipment that manages cells in NTN may be referred to as an NTN Base Station (BS), which may be located on satellite equipment or ground equipment. The network side equipment that manages cells in TN may be referred to as a TN BS, which may be located on ground equipment.

The network side equipment according to the present disclosure may be any type of Transmit and Receive Port (TRP). The TRP may have a function of transmitting and receiving. For example, the TRP may receive information from a user equipment and a base station equipment, and may transmit information to the user equipment and the base station. In addition, the network side equipment described in the present disclosure may be a base station equipment, such as an eNB or gNB (base station in the 5th generation communication system).

The user equipment according to the present disclosure may be a mobile terminal (such as a smartphone, a tablet personal computer (PC), a notebook PC, a portable game terminal, a portable/dongle mobile router, and a digital camera) or a vehicle-mounted terminal (such as car navigation equipment). The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) installed on each of the aforementioned terminals.

2. CONFIGURATION EXAMPLE OF USER EQUIPMENT

FIG. 1 is a block diagram showing an example of a configuration of an electronic equipment 100 according to an embodiment of the present disclosure. The electronic equipment 100 here may serve as a user equipment in a wireless communication system.

As shown in FIG. 1, the electronic equipment 100 may include a communication unit 110 and a determining unit 120.

Here, each unit of the electronic equipment 100 may be included in processing circuitry. It should be noted that the electronic equipment 100 may include a single processing circuit or multiple processing circuits. Further, the processing circuit may include various discrete functional units to perform various different functions and/or operations. It should be noted that these functional units may be physical entities or logical entities, and units with different names may be implemented by a same physical entity.

According to an embodiment of the present disclosure, the electronic equipment 100 may receive, through the communication unit 110, information related to a TAG from a network side equipment that serves the electronic equipment.

According to an embodiment of the present disclosure, the determining unit 120 may enable or disable HARQ processes between the electronic equipment 100 and all cells in the TAG based on the received information related to the TAG.

It can be seen that, according to an embodiment of the present disclosure, the electronic equipment 100 may enable or disable the HARQ processes between the electronic equipment 100 and all cells in the TAG based on the information related to the TAG. The HARQ processes between the electronic equipment 100 and all cells in the TAG refers to all the HARQ processes between the electronic equipment 100 and all the cells in the TAG. In this way, the electronic equipment 100 may enable/disable the HARQ processes in units of TAGs. Further, the information related to the TAG may be UE-Specific information, that is, the TAG-related information is information regarding the electronic equipment 100. In this way, the HARQ processes of a specific user equipment may be enabled or disabled based on information from the network side equipment. Based on the above, according to the embodiment of the present disclosure, the HARQ processes of a specific user equipment can be enabled or disabled in units of TAGs. Therefore, according to the embodiments of the present disclosure, enabling and disabling of the HARQ processes can be more reasonable.

According to an embodiment of the present disclosure, the information related to the TAG may include a Timing Advance Command (TAC) related to the TAG.

Here, the TAC may be a command for all cells in the TAG. The TAC may indicate an identity of the TAG, and such indication includes an explicit indication manner and an implicit indication manner. For example, the TAC may be represented by 8 bits, where the first 2 bits indicate the identity of the TAG, and the last 6 bits indicates a value of TA between the cells in the TAG and the user equipment. For another example, the TAC may be represented by 11 bits, where all of these 11 bits indicate the value of TA. In this case, the TAG targeted by the TAC is the TAG to which the cell initially accessed by the user equipment belongs.

According to an embodiment of the present disclosure, the determining unit 120 may determine the value of TA according to the received TAC. For example, the value of TA in the TAC indicates an offset value of TA. The determining unit 120 may determine a new value of TA according to the offset value of TA, that is, determine a new value of TA by adding a current value of TA to the offset value of TA. In other words, N_TA new=N_TA old+N_TA offset. Here, N_TA new represents the new value of TA, N_TA old represents the current value of TA before the TAC is received, and N_TA offset represents the offset value of TA included in the TAC.

According to an embodiment of the present disclosure, the determining unit 120 may enable or disable the HARQ processes between the electronic equipment 100 and all cells in the TAG according to the determined value of TA.

According to an embodiment of the present disclosure, the determining unit 120 may determine to enable or disable the HARQ processes between the electronic equipment 100 and all cells in the TAG according to a relationship between the determined value of TA and a predetermined threshold of TA.

According to an embodiment of the present disclosure, when the value of TA is greater than the predetermined threshold of TA, the determining unit 120 may determine to disable the HARQ processes between the electronic equipment 100 and all cells in the TAG. Further, when the value of TA is not greater than the predetermined threshold of TA, the determining unit 120 may determine to enable the HARQ processes between the electronic equipment and all cells in the TAG.

According to an embodiment of the present disclosure, the predetermined threshold of TA may be an appointed value that is appointed in advance between the network side equipment and the electronic equipment 100. Alternatively, the predetermined threshold of TA may be a predetermined threshold assigned by the network side equipment for the electronic equipment 100, so that the electronic equipment 100 may receive the predetermined threshold of TA from the network side equipment.

According to an embodiment of the present disclosure, when the value of TA is greater than the predetermined threshold of the TA, it indicates that a distance between the electronic equipment 100 and the network side equipment is relatively large. In this case, enabling the HARQ processes may cause degradation of system performance. Therefore, according to the embodiment of the present disclosure, the HARQ processes may be disabled in this case. On the contrary, when the value of TA is not greater than the predetermined threshold of TA, it indicates that the distance between the electronic equipment 100 and the network side equipment is relatively small. In this case, enabling HARQ may increase effectiveness of the system. It can be seen that, according to the embodiment of the present disclosure, the HARQ processes may be reasonably enabled or disabled by reasonably setting the predetermined threshold of TA.

The value of TA is identical between the electronic equipment 100 and each of the cells in a TAG, and therefore the distances between the electronic equipment 100 and each of the cells are equal or close. Therefore, according to the embodiment of the present disclosure, the HARQ processes may be enabled or disabled in units of TAGs.

As described above, according to an embodiment of the present disclosure, the electronic equipment 100 may determine the value of TA of a TAG according to a TAC for the TAG from the network side equipment, so as to enable or disable the HARQ processes with all cells in the TAG according to the value of TA. In this way, the electronic equipment 100 is not explicitly instructed by the network side equipment to enable or disable the HARQ processes with all cells in a specific TAG, but determines by itself according to the value of TA to enable or disable the HARQ processes with all cells in a specific TAG, which may be regarded as instructed in an implicit manner.

Figure 2:
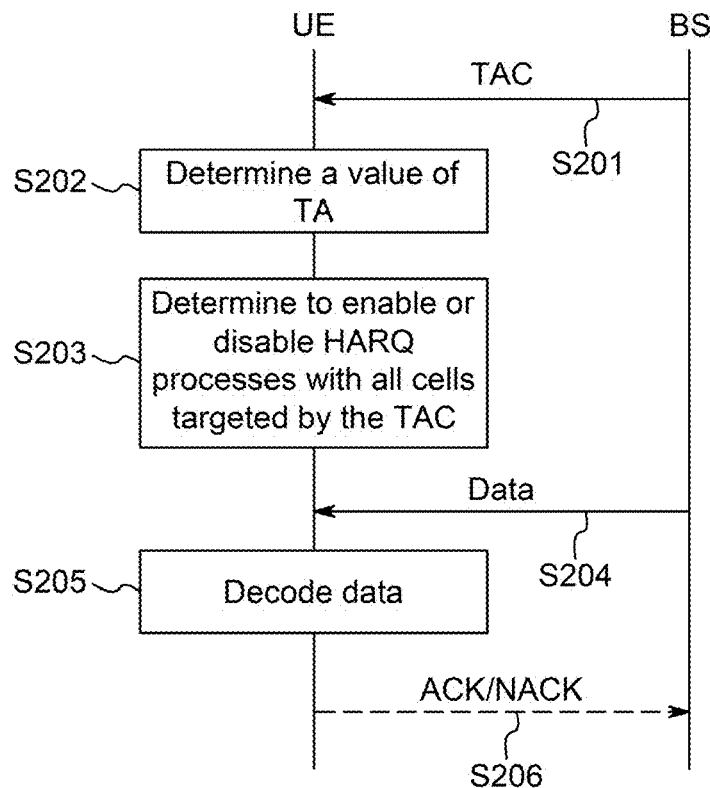
FIG. 2 is a diagram showing a signaling flow of enabling/disabling HARQ processes according to an embodiment of the present disclosure.

FIG. 2 is a diagram showing a signaling flow of enabling/disabling HARQ processes according to an embodiment of the present disclosure. In FIG. 2, the UE may be implemented by the electronic equipment 100, and the BS may be a network side equipment that provides services for the UE. As shown in FIG. 2, in step S201, the BS transmits a TAC for the TAG to the UE. Next, in step S202, the UE determines a value of TA according to the received TAC. Next, in step S203, the UE determines to enable or disable the HARQ processes with all cells in the TAG targeted by the TAC according to the value of TA. Next, in step S204, the BS transmits downlink data to the UE. Next, in step S205, the UE decodes the data. Here, it is assumed that the BS belongs to the TAG targeted by the TAC, then the UE does not perform feedback in a case where the UE determines in step S203 to disable the HARQ processes with all cells in the TAG; and in a case where the UE determines in step S203 to enable the HARQ processes with all cells in the TAG, the UE feeds back, in step S206, ACK/NACK to the BS according to a decoding result in step S205. Therefore, the UE may enable or disable the HARQ processes with all cells in the TAG according to the value of TA of the TAG.

According to an embodiment of the present disclosure, the information related to the TAG may include configuration information of the TAG, and the configuration information of the TAG includes information related to enabling or disabling of the HARQ processes. Further, the information related to the TAG may be carried by high layer signaling such as Radio Resource Control (RRC) information. For example, the configuration information of the TAG may be the "TAG-Config information element" in the RRC information.

According to an embodiment of the present disclosure, the network side equipment may use an existing field in the "TAG-Config information element" to instruct to enable or disable the HARQ processes. For example, the network side equipment may use a value of the "timeAlignmentTimer" field in the "TAG-Config information element" information to instruct to enable or disable the HARQ processes between the user equipment and all cells in the TAG. According to an embodiment of the present disclosure, the value of the "timeAlignmentTimer" field in the "TAG-Config information element" information indicates a TA timer, which is configured to maintain the TAC received by the electronic equipment 100, and the value of this field indicates an effective time of the value of TA. In a case where it is determined to disable the HARQ processes between the user equipment and all cells in the TAG targeted by the "TAG-Config information element" information, the network side equipment may set the value of the "timeAlignmentTimer" field to a predetermined value (preferably to "infinity"); and in a case where it is determined to enable the HARQ processes between the user equipment and all the cells in the TAG targeted by the "TAG-Config information element" information, the network side equipment may set the value of the "timeAlignmentTimer" field to a non-predetermined value, that is, the effective time of the value of TA.

According to the embodiments of the present disclosure, the network side equipment may add a field to the "TAG-Config information element" to instruct to enable or disable the HARQ processes between the user equipment and all cells in the TAG targeted by the "TAG-Config information element". For example, the network side equipment may add a "HARQ_feedback_enable" field to the "TAG-Config information element". A value "ON" of this field instructs to enable the HARQ processes between the user equipment and all cells in the TAG targeted by the "TAG-Config information element"; and a value "OFF" of this field instructs to disable the HARQ processes between the user equipment and all the cells in the TAG targeted by the "TAG-Config information element".

According to an embodiment of the present disclosure, the determining unit 120 may enable or disable the HARQ processes between the electronic equipment 100 and all cells in the TAG according to information in the configuration information of the TAG related to enabling or disabling of the HARQ processes. Specifically, the determining unit 120 may enable or disable the HARQ processes between the electronic equipment 100 and all cells in the TAG according to a value of a field in the configuration information of the TAG which is related to enabling or disabling of the HARQ processes.

For example, in a case where the network side equipment uses the value of the "timeAlignmentTimer" field in the "TAG-Config information element" information to instruct to enable or disable the HARQ processes between the electronic equipment 100 and all cells in the TAG, the determining unit 120 may determine the value of the "timeAlignmentTimer" field, and determine to disable the HARQ processes between the electronic equipment 100 and all cells in the TAG if the value of the "timeAlignmentTimer" field is a predetermined value (preferably, "infinity"), or determine to enable the HARQ processes between the electronic equipment 100 and all cells in the TAG if the value of the "timeAlignmentTimer" field is a non-predetermined value (preferably, "infinity"). For another example, in a case where the network side equipment uses the value of the "HARQ_feedback_enable" field in the "TAG-Config information element" information to instruct to enable or disable the HARQ processes between the electronic equipment 100 and all cells in the TAG, the determining unit 120 may determine the value of the "HARQ_feedback_enable" field, and determine to enable the HARQ processes between the electronic equipment 100 and all cells in the TAG if the value of the "HARQ_feedback_enable" field is "ON", or determine to disable the HARQ processes between the electronic equipment 100 and all cells in the TAG if the value of the "HARQ_feedback_enable" field is "OFF".

As described above, according to an embodiment of the present disclosure, the electronic equipment 100 may determine to enable or disable the HARQ processes according to the value of the field in the configuration information of the TAG which is related to enabling or disabling of the HARQ processes. In other words, the network side equipment is the subject that decides to enable or disable the HARQ processes, and the electronic equipment 100 may enable or disable the HARQ processes according to an instruction from the network side equipment. Such indication may be regarded as an explicit indication.

Figure 3:
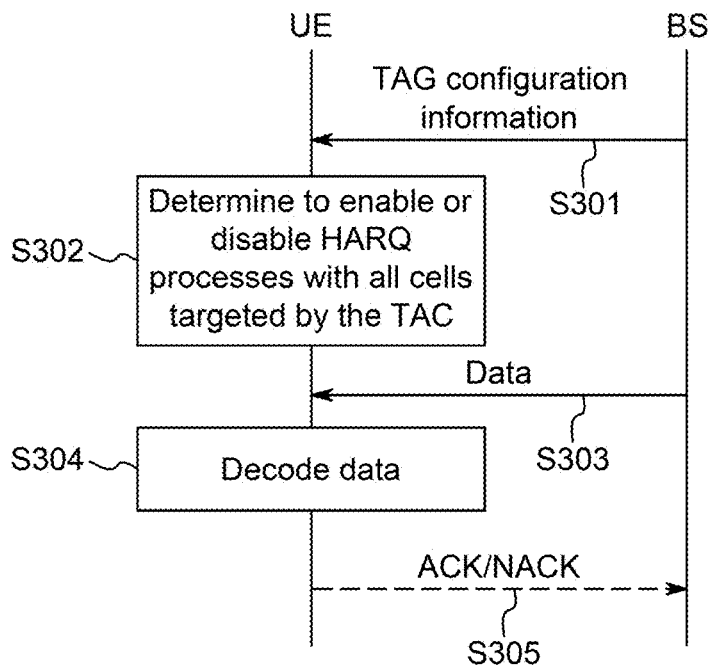
FIG. 3 is a diagram showing a signaling flow of enabling/disabling HARQ processes according to an embodiment of the present disclosure.

FIG. 3 is a diagram showing a signaling flow of enabling/disabling HARQ processes according to an embodiment of the present disclosure. In FIG. 3, the UE may be implemented by the electronic equipment 100, and the BS may be a network side equipment that provides services for the UE. As shown in FIG. 3, in step S301, the BS transmits configuration information of a TAG to the UE. Next, in step S302, the UE determines, according to the configuration information of the TAG, to enable or disable HARQ processes with all cells in the TAG targeted by the configuration information of the TAG. Next, in step S303, the BS transmits downlink data to the UE. Next, in step S304, the UE decodes the data. Here, it is assumed that the BS belongs to the TAG targeted by the configuration information of the TAG, then the UE does not perform feedback in a case where the UE determines in step S302 to disable the HARQ processes with all cells in the TAG; and in a case where the UE determines in step S302 to enable the HARQ processes with all cells in the TAG, the UE feeds back, in step S305, ACK/NACK to the BS according to a decoding result in step S304. Therefore, the UE may enable or disable the HARQ processes with all cells in the TAG according to the configuration information of the TAG.

According to an embodiment of the present disclosure, as shown in FIG. 1, the electronic equipment 100 may further include a feedback unit 130 configured to generate feedback information for downlink data.

According to an embodiment of the present disclosure, in a case where the determining unit 120 determines to enable the HARQ processes between the electronic equipment 100 and all cells in the TAG, when data is received from the network side equipment of the cells in the TAG, the feedback unit 130 may generate feedback information for the data and feed back to the network side equipment that transmits the data. The feedback information includes ACK or NACK. Further, in a case where the determining unit 120 determines to disable the HARQ processes between the electronic equipment 100 and all cells in the TAG, when data is received from the network side equipment of the cells in the TAG, the feedback unit 130 does not transmit any feedback information to the network side equipment that transmits the data. Here, the data received from the network side equipment may include control data and service data.

According to an embodiment of the present disclosure, the electronic equipment 100 may receive updated information related to the TAG from the network side equipment through the communication unit 110, and the determining unit 120 may disable or enable the HARQ processes between the electronic equipment 100 and all cells in the TAG according to the updated information related to the TAG.

For example, in a case where the information related to the TAG is a TAC, the electronic equipment 100 may receive an updated TAC from the network side equipment through the communication unit 110, re-determine the value of TA, and thereby determine to disable or enable the HARQ processes between the electronic equipment 100 and all cells in the TAG according to the re-determined value of TA. For another example, in a case where the information related to the TAG is configuration information of the TAG, the electronic equipment may receive updated configuration information of the TAG from the network side equipment through the communication unit 110, and determine to disable or enable the HARQ processes between the electronic equipment 100 and all cells in the TAG according to the updated configuration information of the TAG.

As described above, according to the embodiments of the present disclosure, the HARQ processes between a specific electronic equipment 100 and all cells in the TAG may be enabled or disabled in units of TAGs for the electronic equipment 100.

According to an embodiment of the present disclosure, the electronic equipment 100 may disable or enable a specific HARQ process according to information related to the specific HARQ process from the network side equipment.

According to an embodiment of the present disclosure, the electronic equipment 100 may receive the information related to the specific HARQ process from the network side equipment through the communication unit 110. Here, the information related to the specific HARQ process may include identification information of the HARQ process. Further, the information related to the specific HARQ process may further include information indicating enabling of disabling of the HARQ process. Further, according to an embodiment of the present disclosure, the determining unit 120 may identify the specific HARQ process according to the received information related to the specific HARQ process. Further, the determining unit 120 may determine to disable or enable the specific HARQ process according to the received information related to the specific HARQ process.

According to an embodiment of the present disclosure, the information related to the specific HARQ process may be carried by low layer signaling such as Downlink Control Information (DCI).

As described above, according to an embodiment of the present disclosure, all HARQ processes between the electronic equipment 100 and all cells in the TAG may be enabled or disabled according to the information related to the TAG. Further, the specific HARQ process may be enabled or disabled according to the information related to the specific HARQ process.

Figure 4:
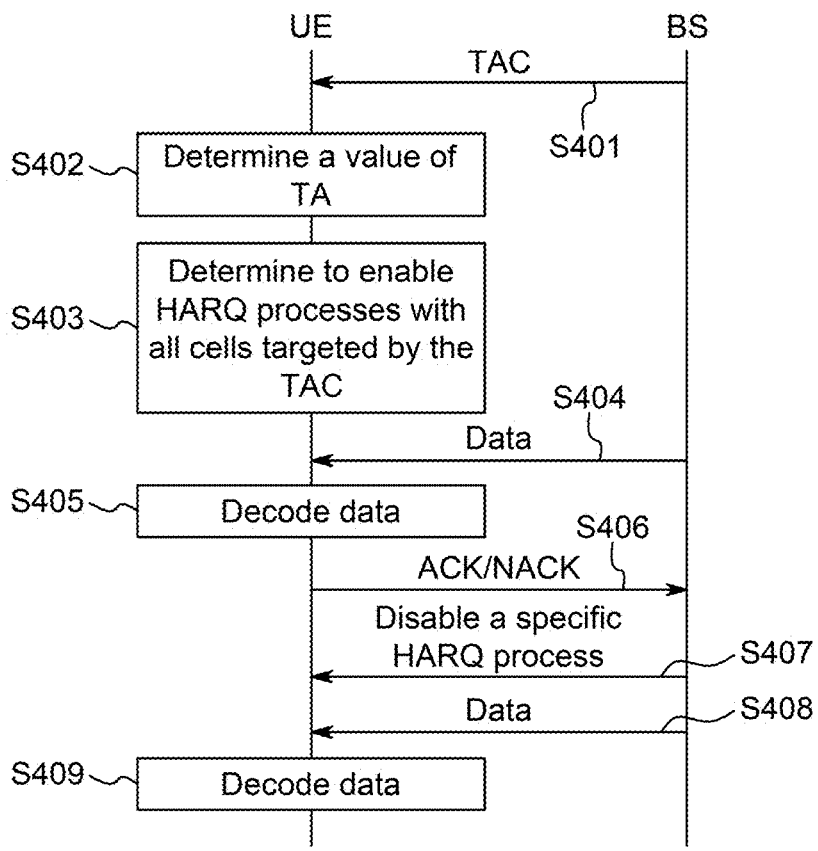
FIG. 4 is a diagram showing a signaling flow of enabling/disabling HARQ processes according to an embodiment of the present disclosure.

FIG. 4 is a diagram showing a signaling flow of enabling/disabling HARQ processes according to an embodiment of the present disclosure. In FIG. 4, the UE may be implemented by the electronic equipment 100, and the BS may be a network side equipment that provides services for the UE. As shown in FIG. 4, in step S401, the BS transmits a TAC to the UE. Next, in step S402, the UE determines a value of TA according to the TAC. Next, in step S403, the UE determines to enable HARQ processes with all cells in the TAG targeted by the TAC according to the value of TA. Next, in step S404, the BS transmits downlink data to the UE. Next, in step S405, the UE decodes the data. Here, it is assumed that the BS belongs to the TAG targeted by the TAC, the UE feeds back, in step S406, ACK/NACK to the BS according to a decoding result in step S405. Next, in step S407, the UE receives, from the BS, information related to a specific HARQ process, which instructs to disable the specific HARQ process. In step S408, the BS transmits data belonging to the specific HARQ process to the UE. In step S409, the UE decodes the data and does not transmit feedback information to the BS. Therefore, the UE may enable the HARQ processes with all cells in the TAG according to the TAC, and disable the specific HARQ process according to the information related to the specific HARQ process.

Figure 5:
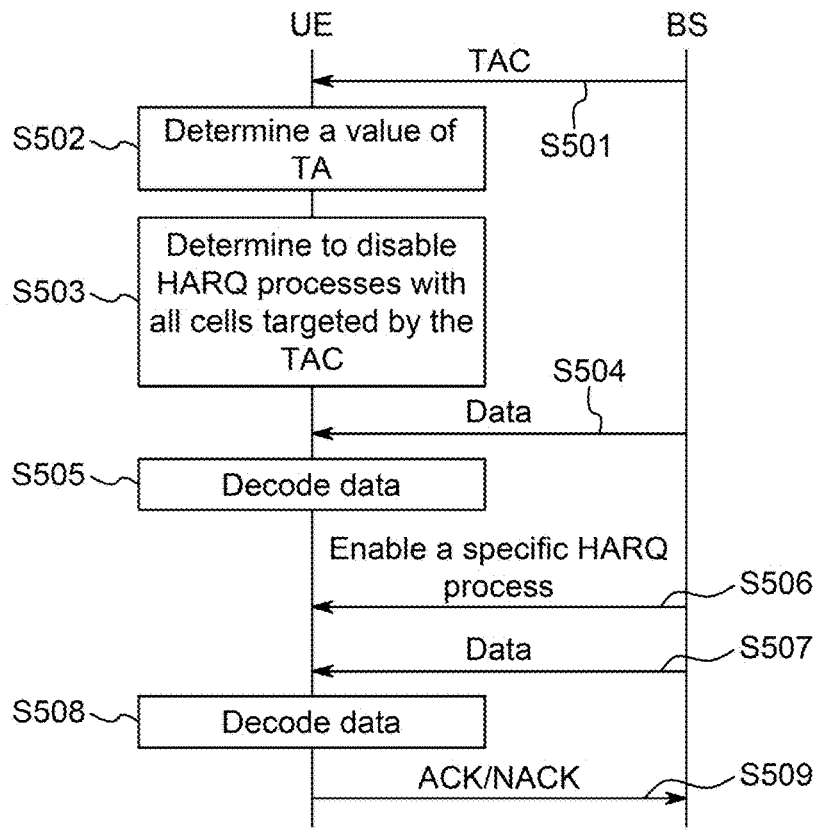
FIG. 5 is a diagram showing a signaling flow of enabling/disabling HARQ processes according to an embodiment of the present disclosure.

FIG. 5 is a diagram showing a signaling flow of enabling/disabling HARQ processes according to an embodiment of the present disclosure. In FIG. 5, the UE may be implemented by the electronic equipment 100, and the BS may be a network side equipment that provides services for the UE. As shown in FIG. 5, in step S501, the BS transmits a TAC to the UE. Next, in step S502, the UE determines a value of TA according to the TAC. Next, in step S503, the UE determines to disable the HARQ processes with all cells in the TAG targeted by the TAC according to the value of TA. Next, in step S504, the BS transmits downlink data to the UE. Next, in step S505, the UE decodes the data. Here, assuming that the BS belongs to the TAG targeted by the TAC, the UE does not transmit feedback information to the BS. Next, in step S506, the UE receives, from the BS, information related to a specific HARQ process, which instructs to enable the specific HARQ process. In step S507, the BS transmits data belonging to the specific HARQ process to the UE. In step S508, the UE decodes the data. Next, in step S509, the UE feeds back ACK/NACK to the BS according to a decoding result in step S508. Therefore, the UE may disable the HARQ processes with all cells in the TAG according to the TAC, and enable the specific HARQ process according to the information related to the specific HARQ process.

Figure 6:
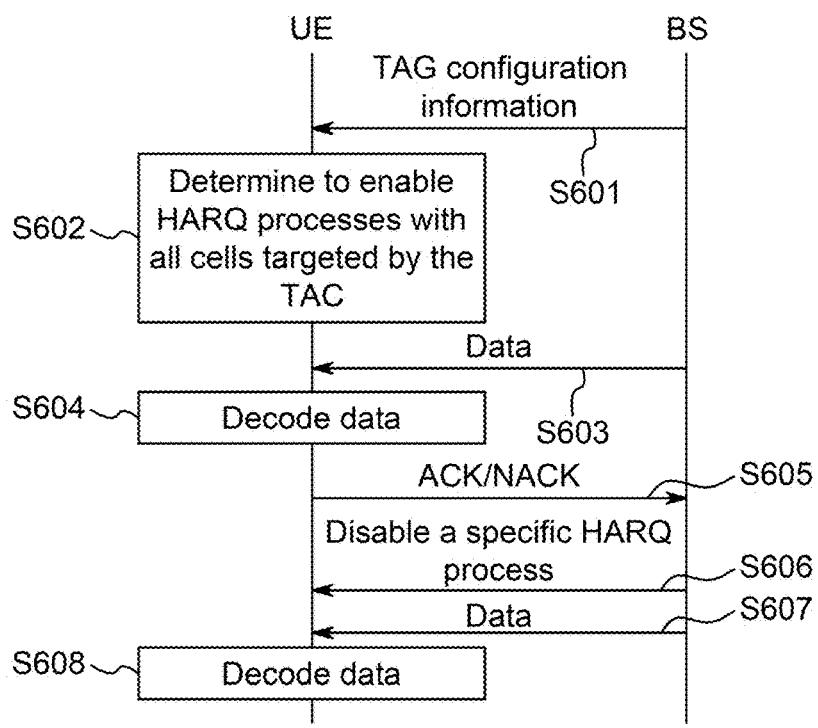
FIG. 6 is a diagram showing a signaling flow of enabling/disabling HARQ processes according to an embodiment of the present disclosure.

FIG. 6 is a diagram showing a signaling flow of enabling/disabling HARQ processes according to an embodiment of the present disclosure. In FIG. 6, the UE may be implemented by the electronic equipment 100, and the BS may be a network side equipment that provides services for the UE. As shown in FIG. 6, in step S601, the BS transmits configuration information of a TAG to the UE. Next, in step S602, the UE determines, according to the configuration information of the TAG, to enable the HARQ processes with all cells in the TAG targeted by the configuration information of the TAG. Next, in step S603, the BS transmits downlink data to the UE. Next, in step S604, the UE decodes the data. Here, it is assumed that the BS belongs to the TAG targeted by the configuration information of the TAG. In step S605, the UE feeds back ACK/NACK to the BS according to a decoding result in step S604. Next, in step S606, the UE receives, from the BS, information related to a specific HARQ process, which instructs to disable the specific HARQ process. In step S607, the BS transmits data belonging to the specific HARQ process to the UE. In step S608, the UE decodes the data and does not transmit feedback information to the BS. Therefore, the UE may enable the HARQ processes with all cells in the TAG according to the configuration information of the TAG, and disable the specific HARQ process according to the information related to the specific HARQ process.

Figure 7:
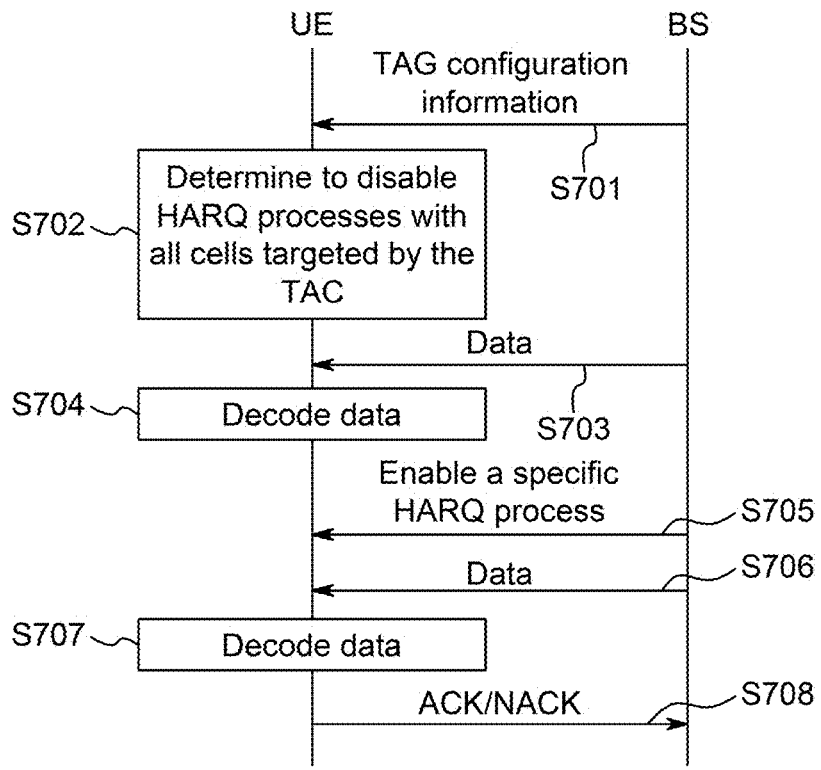
FIG. 7 is a diagram showing a signaling flow of enabling/disabling HARQ processes according to an embodiment of the present disclosure.

FIG. 7 is a diagram showing a signaling flow of enabling/disabling HARQ processes according to an embodiment of the present disclosure. In FIG. 7, the UE may be implemented by the electronic equipment 100, and the BS may be a network side equipment that provides services for the UE. As shown in FIG. 7, in step S701, the BS transmits configuration information of the TAG to the UE. Next, in step S702, the UE determines, according to the configuration information of the TAG, to disable the HARQ processes with all cells in the TAG targeted by the configuration information of the TAG. Next, in step S703, the BS transmits downlink data to the UE. Next, in step S704, the UE decodes the data. Here, it is assumed that the BS belongs to the TAG targeted by the configuration information of the TAG, and therefore the UE does not feed ACK/NACK back to the BS. Next, in step S705, the UE receives, from the BS, information related to a specific HARQ process, which instructs to enable the specific HARQ process. In step S706, the BS transmits data belonging to the specific HARQ process to the UE. In step S707, the UE decodes the data. Next, in step S708, the UE transmits feedback information to the BS. Therefore, the UE may disable the HARQ processes with all cells in the TAG according to the configuration information of the TAG, and enable the specific HARQ process according to the information related to the specific HARQ process.

According to an embodiment of the present disclosure, the electronic equipment 100 has one or more serving cells, and the one or more serving cells are divided into one or more TAGs. According to an embodiment of the present disclosure, the electronic equipment 100 may receive information related to each of the TAGs from the network side equipment of a primary serving cell of the electronic equipment 100.

According to an embodiment of the present disclosure, for example, the network side equipment of the primary serving cell may configure one or more serving cells for the electronic equipment 100, divide the one or more serving cells into multiple TAGs, and transmits information of the TAGs to which each of the cells belongs to the electronic equipment 100. The information related to configuration of the TAGs may be carried by the "TAG-Config information element" in the RRC information.

In other words, according to an embodiment of the present disclosure, the electronic equipment 100 may receive information related to each of the TAGs of the electronic equipment 100 from the network side equipment of the primary serving cell. Therefore, for each of the TAGs, the electronic equipment 100 may enable or disable HARQ processes with all cells in the TAG according to the information related to the TAG. Here, the primary serving cell may be a Special Cell (SPCell) including a primary cell (PCell) of the electronic equipment 100, which is the cell that the electronic equipment 100 initially accesses, and a Primary Secondary Cell (PSCell) of the electronic equipment 100, which is a primary cell in a secondary cell group (SCG).

For example, it is assumed that the electronic equipment 100 has three serving cells, including a primary cell and two secondary cells (SCell), namely PCell, SCell1, and SCell2. Further, the PCell and SCell1 belong to TAG1, and the SCell2 belongs to TAG2. In this case, the electronic equipment 100 may receive information related to TAG1 from a network side equipment of the PCell, and thereby determine to enable or disable HARQ processes with all cells (PCell and SCell1) in TAG1. Further, the electronic equipment 100 may receive information related to TAG2 from the network side equipment of the PCell, and thereby determine to enable or disable HARQ processes with all cells (SCell2) in TAG2.

It can be seen that, according to the embodiments of the present disclosure, the electronic equipment 100 may enable or disable HARQ processes between the electronic equipment 100 and all cells in the TAG according to information related to the TAGs. In this way, the electronic equipment 100 may enable/disable the HARQ processes in units of TAGs. Further, the information related to a TAG (for example, a TAC or configuration information of the TAG) is UE-Specific information. In this way, the HARQ processes of a specific user equipment may be enabled/disabled based on information from the network side equipment. In summary, according to the embodiments of the present disclosure, the HARQ processes of a specific user equipment may be enabled or disabled in units of TAGs. Further, according to the embodiments of the present disclosure, the network side equipment may instruct to enable or disable the HARQ processes in an explicit manner and an implicit manner. In addition, the electronic equipment 100 may re-determine to enable or disable the HARQ processes according to updated information related to the TAG. Further, the electronic equipment 100 may further enable or disable a specific HARQ process according to information related to the specific HARQ process from the network side equipment. In summary, according to the embodiments of the present disclosure, the HARQ processes may be enabled and disabled more reasonably.

3. CONFIGURATION EXAMPLE OF NETWORK SIDE EQUIPMENT

Figure 8:
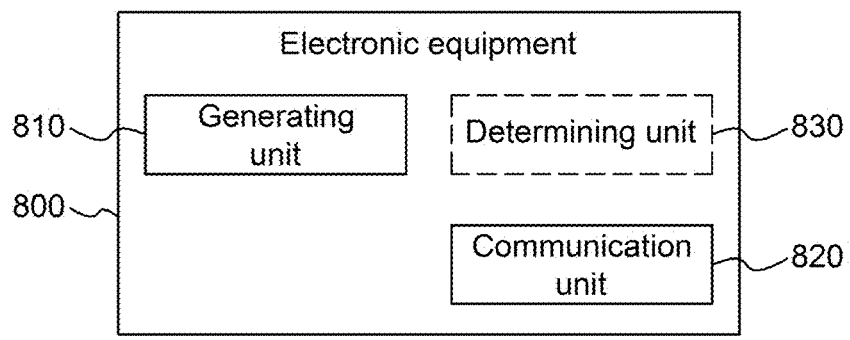
FIG. 8 is a block diagram showing an exemplary configuration of an electronic equipment according to an embodiment of the present disclosure.

FIG. 8 is a block diagram showing a structure of an electronic equipment 800 serving as a network side equipment in a wireless communication system according to an embodiment of the present disclosure.

As shown in FIG. 8, the electronic equipment 800 may include a generating unit 810 and a communication unit 820.

Here, each unit of the electronic equipment 800 may be included in a processing circuit. It should be noted that the electronic equipment 800 may include a single processing circuit or multiple processing circuits. Further, the processing circuit may include various discrete functional units for performing various different functions and/or operations. It should be noted that these functional units may be physical entities or logical entities, and units with different names may be implemented by a same physical entity.

According to an embodiment of the present disclosure, the generating unit 810 may generate information related to a TAG of the user equipment served by the electronic equipment 800. Here, the information related to the TAG of the user equipment may be used to instruct the user equipment to enable or disable HARQ processes with all cells in the TAG.

According to an embodiment of the present disclosure, the electronic equipment 800 may transmit the information related to the TAG to the user equipment through the communication unit 820, to instruct the user equipment to enable or disable the HARQ processes with all cells in the TAG.

As described above, according to an embodiment of the present disclosure, the electronic equipment 800 may generate information related to the TAG of the user equipment to instruct the user equipment to enable or disable the HARQ processes with all cells in the TAG, so that the HARQ processes may be enabled or disabled more reasonably.

According to an embodiment of the present disclosure, the information related to the TAG generated by the generating unit 810 may include a TAC related to the TAG, and the TAC indicates a value of TA that is identical between the user equipment and all cells in the TAG.

According to an embodiment of the present disclosure, the generating unit 810 may include identification information of the TAG and a value for indicating the TA (such as an offset value of TA) into the TAC. Further, the generating unit 810 may include only the value for indicating the TA into the TAC. In this case, the TAC corresponds to the TAG where the cell initially accessed by the user equipment belongs.

According to the embodiments of the present disclosure, predetermined thresholds of TA may be set for each of the TAGs, or a unified predetermined threshold of TA may be set for all TAGs. Here, the predetermined threshold of TA of any TAG may be pre-appointed by the electronic equipment 800 and the user equipment. Further, the electronic equipment 800 may transmit the predetermined threshold of TA of any TAG to the user equipment through the communication unit 820. In this way, the user equipment may determine the value of TA according to the TAC, and determine to enable or disable the HARQ processes with all cells in the TAG using the predetermined threshold of TA and the value of TA.

According to an embodiment of the present disclosure, the electronic equipment 800 may determine the predetermined threshold of TA according to capability of the user equipment. According to an embodiment of the present disclosure, the electronic equipment 800 may receive capability information of the user equipment from the user equipment through the communication unit 820. Here, the capability of the user equipment may include a user category and capability for dual-connectivity of the user equipment.

According to an embodiment of the present disclosure, the electronic equipment 800 may determine a rate supported by the user equipment according to the user category. Further, according to an embodiment of the present disclosure, in a case where the rate supported by the user equipment is relatively high, the electronic equipment 800 may set the predetermined threshold of TA to be relatively low, so that the user equipment is more likely to disable the HARQ processes; and in a case when the rate supported by the user equipment is relatively low, the electronic equipment 800 may set the predetermined threshold of TA to be relatively high, so that the user equipment is less likely to disable the HARQ processes.

According to an embodiment of the present disclosure, the electronic equipment 800 may further determine the predetermined threshold of TA according to the capability for dual-connectivity of the user equipment. For example, in a case where the user equipment has the capability for dual-connectivity, the user equipment may be connected to two cells (for example, a cell in TN and a cell in NTN), and the electronic equipment 800 may set the predetermined threshold of TA of the TAG where the cell in TN is located to be relatively high, so that the user equipment is less likely to disable the HARQ process, and may set the predetermined threshold of TA of the TAG where the cell in NTN is located to be relatively low, so that the user equipment is more likely to disable the HARQ process. In this way, for a high-reliability service, the reliability may be ensured by performing transmission through the cell in TN whose HARQ is enabled, and a high-rate transmission may be achieved by disabling the HARQ of the cell in NTN.

In addition, according to an embodiment of the present disclosure, the electronic equipment 800 may determine the predetermined threshold of TA according to a sensitivity of a service of the user equipment to latency. For example, in a case where the service of the user equipment is sensitive to latency, the electronic equipment 800 may set the predetermined threshold of TA to be relatively low, so that the user equipment is more likely to disable the HARQ processes; and in a case where the service of the user equipment is not sensitive to latency, the electronic equipment 800 may set the predetermined threshold of TA to be relatively high, so that the user equipment is less likely to disable the HARQ processes.

As described above, embodiments in which the electronic equipment 800 sets the predetermined threshold of TA are described by non-limiting embodiments, and the present disclosure is not limited thereto. The electronic equipment 800 may determine the predetermined threshold of TA by comprehensively considering user capability and the sensitivity of the service to latency. Apparently, the electronic equipment 800 may determine the predetermined threshold of TA considering another parameter.

As mentioned above, the electronic equipment 800 may instruct the value of TA to the user equipment by the TAC, configure the predetermined threshold of TA, so that the user equipment may determine to enable or disable the HARQ processes with all cells related to the TAG according to the value of TA and the predetermined threshold of TA. In this way, an indication may be provided to the user equipment in an implicit manner. In other words, the user equipment is the subject that decides to enable or disable the HARQ processes.

According to an embodiment of the present disclosure, as shown in FIG. 8, the electronic equipment 800 may further include a determining unit 830, configured to determine to enable or disable the HARQ processes between the user equipment and all cells in the TAG. Further, the generating unit 810 may generate the information related to the TAG according to a result determined by the determining unit 830.

According to an embodiment of the present disclosure, the determining unit 820 may determine to enable or disable the HARQ processes between the user equipment and all cells in the TAG according to the value of TA that is identical between the user equipment and all cells in the TAG.

Here, the electronic equipment 800 may receive uplink information from the user equipment, and determine the value of TA according to parameters such as a preamble and Sounding Reference Signal (SRS) included in the uplink information.

According to an embodiment of the present disclosure, when the value of TA that is identical between the user equipment and all cells in the TAG is greater than the predetermined threshold of TA, the determining unit 820 may determine to disable the HARQ processes between the user equipment and all cells in the TAG. Further, when the value of TA that is identical between the user equipment and all cells in the TAG is not greater than the predetermined threshold of TA, the determining unit 820 may determine to enable the HARQ processes between the user equipment and all cells in the TAG. Here, the electronic equipment 800 may determine the predetermined threshold of TA in the described manner.

According to an embodiment of the present disclosure, the determining unit 830 may determine to enable or disable the HARQ processes between the user equipment and all cells in the TAG according to capability of the user equipment. Here, the capability of the user equipment may include a user category and the capability for dual-connectivity of the user equipment.

According to an embodiment of the present disclosure, the determining unit 830 may determine a rate supported by the user equipment according to the user category. Further, according to an embodiment of the present disclosure, for all cells included in a specific TAG, in a case where the rate supported by the user equipment is relatively high, the determining unit 830 may determine to disable the HARQ processes between the user equipment and all cells included in the TAG; and in a case where the rate supported by the user equipment is relatively low, the determining unit 830 may determine to enable the HARQ processes between the user equipment and all cells included in the TAG.

According to an embodiment of the present disclosure, the determining unit 830 may determine to enable or disable the HARQ processes between the user equipment and all cells in the TAG according to the capability for dual-connectivity of the user equipment. For example, in a case where the user equipment has the capability for dual-connectivity, the user equipment may be connected to two cells (for example, a cell in TN and a cell in NTN), the determining unit 830 may enable the HARQ process between the user equipment and the cell in TN, and disable the HARQ process between the user equipment and the cell in NTN. In this way, for a high-reliability service, the reliability may be ensured by performing transmission through the cell in TN whose HARQ is enabled, and a high-rate transmission may be achieved by disabling the HARQ of the cell in NTN In addition, according to an embodiment of the present disclosure, the determining unit 830 may determine to enable or disable the HARQ processes between the user equipment and all cells in the TAG according to a sensitivity of a service of the user equipment to latency. For example, for all cells in a specific TAG, in a case where the service of the user equipment is sensitive to latency, the determining unit 830 may determine to disable the HARQ processes between the user equipment and all cells in the TAG; and in a case where the service of the user equipment is not sensitive to latency, the determining unit 830 may determine to enable the HARQ processes between the user equipment and all cells in the TAG.

As described above, embodiments in which the electronic equipment 800 determines to enable or disable the HARQ processes between the user equipment and all cells in the TAG are described by non-limiting embodiments, and the present disclosure is not limited thereto. The electronic equipment 800 may determine to enable or disable the HARQ processes between the user equipment and all cells in the TAG by comprehensively considering the value of TA, user capability, and the sensitivity of the service to latency. Apparently, the electronic equipment 800 may determine to enable or disable the HARQ processes between the user equipment and all cells in the TAG considering another parameter.

According to an embodiment of the present disclosure, the information related to the TAG generated by the generating unit 810 may include configuration information of the TAG, and the configuration information of the TAG may include information related to enabling or disabling of the HARQ processes.

Here, the electronic equipment 800 may carry the information related to the TAG by high layer signaling such as RRC information. The configuration information of the TAG includes TAG-Config information element information.

According to an embodiment of the present disclosure, the generating unit 810 may use an existing field in the "TAG-Config information element" to instruct to enable or disable the HARQ processes. For example, the generating unit 810 may use a value of the "timeAlignmentTimer" field in the "TAG-Config information element" information to instruct to enable or disable the HARQ processes between the user equipment and all cells in the TAG. According to an embodiment of the present disclosure, in a case where it is determined to disable the HARQ processes of the user equipment and all cells in the TAG targeted by the "TAG-Config information element" information, the generating unit 810 may set the value of the "timeAlignmentTimer" field to a predetermined value (preferably, "infinity"); and in a case where it is determined to enable the HARQ processes between the user equipment and all cells in the TAG targeted by the "TAG-Config information element" information, the generating unit 810 may set the value of the "timeAlignmentTimer" field to a non-predetermined value, that is, the effective time of the value of TA.

According to an embodiment of the present disclosure, the generating unit 810 may add a field related to enabling or disabling of the HARQ processes into the TAG-Config information element information, in order to instruct to enable or disable the HARQ processes between the user equipment and all cells in the TAG.

For example, the generating unit 810 may add a "HARQ_feedback_enable" field into the "TAG-Config information element". A value "ON" of this field instructs to enable the HARQ processes between the user equipment and all cells in the TAG targeted by the "TAG-Config information element"; and a value "OFF" of this field instructs to disable the HARQ processes between the user equipment and all the cells in the TAG targeted by the "TAG-Config information element".

According to an embodiment of the present disclosure, the electronic equipment 800 may update information related to the TAG. For example, the generating unit 810 may update the information related to the TAG of the user equipment, that is, re-generate the information related to the TAG. Further, the electronic equipment 800 may transmit the updated information to the user equipment through the communication unit 810, to instruct the user equipment to disable or enable the HARQ processes with all cells in the TAG. For example, when a value of TA of a certain TAG changes, the generating unit 810 of the electronic equipment 800 may re-generate a TAC for the TAG to be transmitted to the user equipment. For another example, when the electronic equipment 800 determines that it is necessary to disable the HARQ processes that are originally enabled between the user equipment and all cells in the certain TAG, or it is necessary to enable the HARQ processes that are originally disabled between the user equipment and all cells in the certain TAG, the generating unit 810 may re-generate the configuration information of the TAG to be transmitted to the user equipment.

According to an embodiment of the present disclosure, the determining unit 830 may determine to enable or disable a specific HARQ process in the HARQ processes between the user equipment and all cells in the TAG. Therefore, the generating unit 810 may further generate information related to the specific HARQ process to instruct the user equipment to enable or disable the specific HARQ process. Further, the electronic equipment 800 may transmit information related to the specific HARQ process to the user equipment through the communication unit 810 to instruct the user equipment to enable or disable the specific HARQ process. For example, in a case where the determining unit 830 determines that an enabled/disabled state of the specific HARQ process needs to be changed, information related to the specific HARQ process may be transmitted to the user equipment to instruct the user equipment to change the enabled/disabled state of the specific HARQ process.

According to an embodiment of the present disclosure, the electronic equipment 800 may carry the information related to the specific HARQ process by low layer signaling such as DCI.

According to an embodiment of the present disclosure, the user equipment has one or more serving cells, and the one or more serving cells are divided into one or more TAGs. The electronic equipment 800 is a network side equipment of a primary serving cell of the user equipment. Further, the electronic equipment 800 may not only transmit, to the user equipment, information related to the TAG to which the electronic equipment 800 belongs, but also transmit, to the user equipment, information related to the TAG other than the TAG to which the electronic equipment 800 belongs.

The electronic equipment 100 according to the embodiment of the present disclosure may serve as a user equipment, and the electronic equipment 800 may serve as a network side equipment, that is, the electronic equipment 800 may provide services for the electronic equipment 100. Therefore, all the foregoing embodiments regarding the electronic equipment 100 are applicable thereto.

4. METHOD EMBODIMENTS

Next, a wireless communication method performed by the electronic equipment 100 serving as a user equipment in a wireless communication system according to an embodiment of the present disclosure is described in detail.

Figure 9:
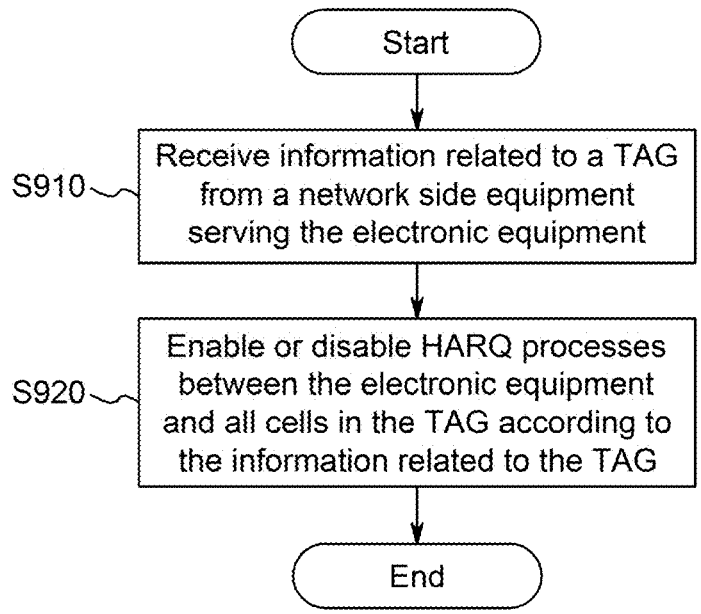
FIG. 9 is a flowchart showing a wireless communication method performed by an electronic equipment according to an embodiment of the present disclosure.

FIG. 9 is a flowchart showing a wireless communication method performed by the electronic equipment 100 serving as a user equipment in a wireless communication system according to an embodiment of the present disclosure.

As shown in FIG. 9, in step S910, information related to a timing advance group TAG is received from a network side equipment serving the electronic equipment.

Next, in step S920, HARQ processes between the electronic equipment and all cells in the TAG is enabled or disabled according to the information related to the TAG.

Preferably, the information related to the TAG includes a timing advance command TAC related to the TAG, and a process of enabling or disabling the HARQ processes between the electronic equipment and all cells in the TAG includes: determining a value of timing advance TA according to the TAC; and enabling or disabling the HARQ processes between the electronic equipment and all cells in the TAG according to the value of TA.

Preferably, a process of enabling or disabling the HARQ processes between the electronic equipment and all cells in the TAG includes: when the value of TA is greater than a predetermined threshold of TA, disabling the HARQ processes between the electronic equipment and all cells in the TAG; and when the value of TA is not greater than the predetermined threshold of TA, enabling the HARQ processes between the electronic equipment and all cells in the TAG.

Preferably, the predetermined threshold of TA is an appointed value between the network side equipment and the electronic equipment; or the wireless communication method further includes: receiving the predetermined threshold of TA from the network side equipment.

Preferably, the information related to the TAG includes configuration information of the TAG, and a process of enabling or disabling the HARQ processes between the electronic equipment and all cells in the TAG includes: enabling or disabling the HARQ processes between the electronic equipment and all cells in the TAG according to information in the configuration information of the TAG which is related to enabling or disabling of the HARQ processes.

Preferably, the information related to the TAG is carried by high layer signaling.

Preferably, the high layer signaling includes RRC information, and the configuration information of the TAG includes TAG-Config information element information.

Preferably, the enabling the HARQ processes between the electronic equipment and all cells in the TAG includes feeding ACK or NACK back to the network side equipment when data is received from network side equipment of a cell in the TAG; and the disabling the HARQ processes between the electronic equipment and all cells in the TAG comprises not feeding ACK or NACK back to the network side equipment when data is received from network side equipment of a cell in the TAG.

Preferably, the data includes control data and service data.

Preferably, the wireless communication method further includes: receiving updated information related to the TAG from the network side equipment, after enabling or disabling the HARQ processes between the electronic equipment and all cells in the TAG; and enabling or disabling the HARQ processes between the electronic equipment and all cells in the TAG according to the updated information related to the TAG.

Preferably, the wireless communication method further includes: receiving, from the network side equipment, information related to a specific HARQ process, after enabling or disabling the HARQ processes between the electronic equipment and all cells in the TAG; and enabling or disabling the specific HARQ process according to the information related to the specific HARQ process.

Preferably, the information related to the specific HARQ process is carried by low layer signaling.

Preferably, the low layer signaling includes DCI.

Preferably, the electronic equipment has one or more serving cells, and the one or more serving cells are divided into one or more TAGs, and the wireless communication method further includes: receiving information related to each of the TAGs from the network side equipment of a primary serving cell of the electronic equipment.

According to an embodiment of the present disclosure, the subject that performs the above-mentioned method may be the electronic equipment 100 according to the embodiment of the present disclosure, and therefore all the foregoing embodiments regarding the electronic equipment 100 are applicable thereto.

Next, a wireless communication method performed by the electronic equipment 800 serving as a network side equipment in a wireless communication system according to an embodiment of the present disclosure is described in detail.

Figure 10:
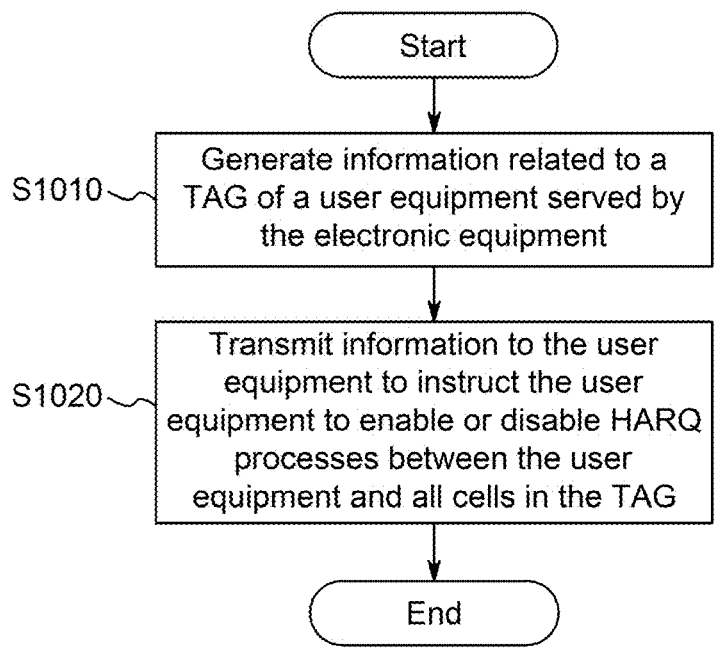
FIG. 10 is a flowchart showing a wireless communication method performed by an electronic equipment according to another embodiment of the present disclosure.

FIG. 10 is a flowchart showing a wireless communication method performed by the electronic equipment 800 serving as a network side equipment in a wireless communication system according to an embodiment of the present disclosure.

As shown in FIG. 10, in step S1010, information related to a timing advance group TAG of a user equipment served by the electronic equipment is generated.

Next, in step S1020, the information related to the TAG is transmitted to the user equipment to instruct the user equipment to enable or disable the HARQ processes with all cells in the TAG.

Preferably, the information related to the TAG includes a timing advance command TAC related to the TAG, and the TAC indicates a value of timing advance TA that is identical between the user equipment and all cells in the TAG.

Preferably, the wireless communication method further includes: determining to enable or disable the HARQ processes between the user equipment and all cells in the TAG; and generating the information related to the TAG according to a result of the determination.

Preferably, the determining to enable or disable the HARQ processes between the user equipment and all cells in the TAG includes: determining to enable or disable the HARQ processes between the user equipment and all cells in the TAG according to the value of timing advance TA that is identical between the user equipment and all cells in the TAG.

Preferably, the determining to enable or disable the HARQ processes between the user equipment and all cells in the TAG includes: when the value of TA is greater than a predetermined threshold of TA, determining to disable the HARQ processes between the user equipment and all cells in the TAG; and when the value of TA is not greater than the predetermined threshold of TA, determining to enable the HARQ processes between the user equipment and all cells in the TAG.

Preferably, the information related to the TAG includes configuration information of the TAG, and the configuration information of the TAG includes information related to enabling or disabling of the HARQ processes.

Preferably, the information related to the TAG is carried by high layer signaling.

Preferably, the high layer signaling includes RRC information, and the configuration information of the TAG includes TAG-Config information element information.

Preferably, a value of a timeAlignmentTimer field in the TAG-Config information element information is used to instruct to enable or disable the HARQ processes between the user equipment and all cells in the TAG.

Preferably, a field related to the enabling or disabling of the HARQ processes is added to the TAG-Config information element information to indicate the enabling or disabling of the HARQ processes between the user equipment and all cells in the TAG.

Preferably, the wireless communication method further includes: updating the information related to the TAG of the user equipment; and transmitting the updated information to the user equipment to instruct the user equipment to disable or enable the HARQ processes between the user equipment and all cells in the TAG.

Preferably, the wireless communication method further includes: determining to enable or disable a specific HARQ process among the HARQ processes between the user equipment and all cells in the TAG; and transmitting information related to the specific HARQ process to the user equipment to instruct the user equipment to enable or disable the specific HARQ process.

Preferably, the information related to the specific HARQ process is carried by low layer signaling.

Preferably, the low layer signaling includes DCI.

Preferably, the user equipment has one or more serving cells, the one or more serving cells are divided into one or more TAGs, and the electronic equipment is a network side equipment of a primary serving cell of the user equipment.

According to an embodiment of the present disclosure, the subject that performs the above-mentioned method may be the electronic equipment 800 according to the embodiment of the present disclosure, and therefore all the foregoing embodiments regarding the electronic equipment 800 are applicable thereto.

5. APPLICATION EXAMPLE

The technology in the present disclosure is applicable to various scenarios. Specifically, in each the scenarios, a user equipment has one or more serving cells, and the one or more serving cells are divided into one or more TAGs. Several embodiments are described below in a non-limiting manner.

Figure 11:
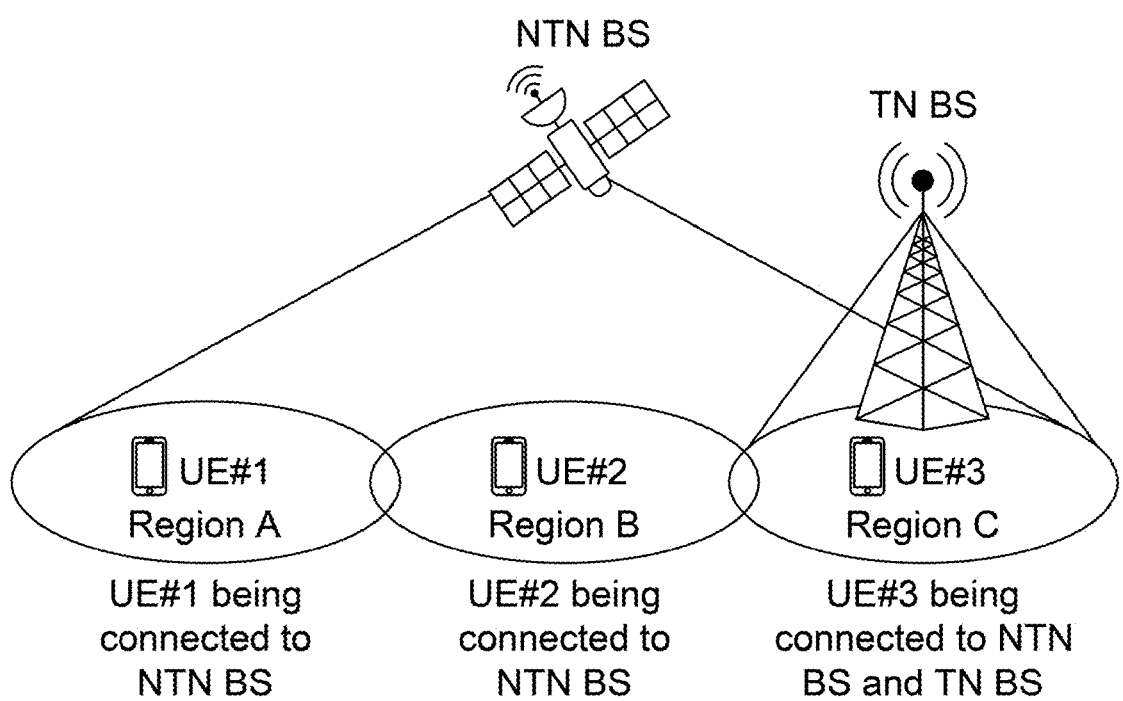
FIG. 11 is a schematic diagram showing an application scenario according to an embodiment of the present disclosure.

FIG. 11 is a schematic diagram showing an application scenario according to an embodiment of the present disclosure. As shown in FIG. 11, NTN BS may cover region A, region B and region C, and TN BS may cover region C. UE #1 is located in area A, UE #2 is located in region B, and UE #3 is located in region C. In the scenario shown in FIG. 11, UE #1 is connected to NTN BS, UE #2 is connected to NTN BS, and UE #3 is connected to both NTN BS and TN BS. In other words, UE #1 has one serving cell, namely region A covered by NTN BS; UE #2 has one serving cell, namely region B covered by NTN BS; and UE #3 has two serving cells, namely region C covered by NTN BS and region C covered by TN BS.

According to an embodiment of the present disclosure, UE #1 has one TAG #1, including region A covered by NTN BS. UE #1 is far away from NTN BS and a transmission latency is large. Therefore, according to an explicit or implicit indication from NTN BS, UE #1 may be configured to disable HARQ with all cells included in TAG #1 so as to provide system efficiency. Furthermore, UE #2 has a TAG #2, including region B covered by NTN BS. It is assumed here that UE #2 is a sensor user which only periodically reports certain data (such as temperature, humidity, and the like) and is not sensitive to latency. Therefore, according to an explicit or implicit indication from NTN BS, UE #2 may be configured to enable HARQ with all cells included in TAG #2 so as to provide system reliability. Further, it is assumed that UE #3 has two TAGs, namely TAG #3 and TAG #4, where TAG #3 includes region C covered by NTN BS, and TAG #4 includes region C covered by TN BS. Region C covered by TN BS is a primary serving cell. According to an explicit or implicit indication from TN BS, UE #3 may be configured to disable HARQ with all cells included in TAG #3, and enable HARQ with all cells included in TAG #4. In other words, UE #3 does not feed back ACK/NACK for downlink data from an NTN cell, but feeds back ACK/NACK for downlink data from a TN cell.

As mentioned above, in a wireless communication system including NTN and TN, the user equipment may be configured to reasonably enable or disable the HARQ processes in units of TAGS.

In a scenario where the UE supports carrier aggregation (CA), the UE may be configured with multiple serving cells. For example, it is assumed that the UE has a serving cell Scell #1 from an Remote Radio Head (RRH) on a synchronous earth satellite, a serving cell Pcell from a ground base station, and a serving cell Scell #2 from a ground base station. The UE is serviced by these cells in a CA manner. It is further assumed that Pcell and Scell #2 belong to one TAG denoted as TAG #1, and the serving cell Scell #1 belongs to another TAG denoted as TAG #2. A network side equipment in the serving cell Pcell of the ground base station may explicitly or implicitly instruct the UE to enable HARQ processes between the UE and all cells in TAG #1, and instruct the UE to disable the HARQ processes between the UE and all cells in TAG #2. For example, for TAG #1, a value of a "HARQ_feedback_enable" field is "ON"; and for TAG #2, the value of the "HARQ_feedback_enable" field is "OFF".

In a scenario where the UE supports dual-connectivity, the UE may be configured with multiple serving cell groups, and each of the serving cell groups includes multiple serving cells. For example, the UE is simultaneously served by a serving cell PScell and a serving cell Scell #1, which are from a geostationary earth satellite base station, and a serving cell Pcell and a serving cell Scell #2, which are from a ground base station, in a dual-connectivity manner. PScell and Scell #1 belong to a secondary cell group (SCG), and Pcell and Scell #2 belong to a master cell group (MCG). It is assumed here that Pcell and Scell #2 belong to one TAG denoted as TAG #1, and PScell and Scell #1 belong to another TAG denoted as TAG #2. The serving cell PScell may explicitly or implicitly instruct the UE to disable HARQ processes between the UE and all cells in TAG #2, in a case where a value of a "HARQ_feedback_enable" field for TAG #2 is "OFF", for example; and the serving cell Pcell may explicitly or implicitly instruct the UE to enable the HARQ process between the UE and all cells in TAG #1, in a case where the value of the "HARQ_feedback_enable" field for TAG #1 is "ON", for example.

The application scenarios of the present disclosure are described above in a non-limiting manner. Those skilled in the art should realize that the present disclosure is applicable to all scenarios where the serving cells of the user equipment are divided into one or more TAGs.

The network side equipment may be implemented as any type of TRP. The TRP may have transmitting and receiving functions, for example, may receive information from a user equipment and a base station device, and may also transmit information to the user equipment and base station device. In a typical example, the TRP may provide services for the user equipment and is controlled by the base station device. Further, the TRP may have a structure similar to that of the base station device described below, or may only have a structure related to transmission and reception of information in the base station device.

The network side equipment may also be implemented as any type of base station device, such as a macro eNB and a small eNB, and may also be implemented as any type of gNB (a base station in a 5G system). The small eNB may be an eNB covering a cell smaller than a macro cell, such as a pico eNB, a micro eNB, and a home (femto) eNB. Instead, the base station may be implemented as any other type of base station, such as a NodeB and a base transceiver station (BTS). The base station may include: a main body (which is also referred to as a base station device) configured to control wireless communication; and one or more remote wireless head ends (RRHs) that are arranged in different places from the main body.

The user equipment may be implemented as a mobile terminal (such as a smartphone, a tablet personal computer (PC), a notebook PC, a portable game terminal, a portable/ dongle-type mobile router, and a digital camera) or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the user equipment described above.

[Application Examples of the Base Station]

First Application Example

Figure 12:
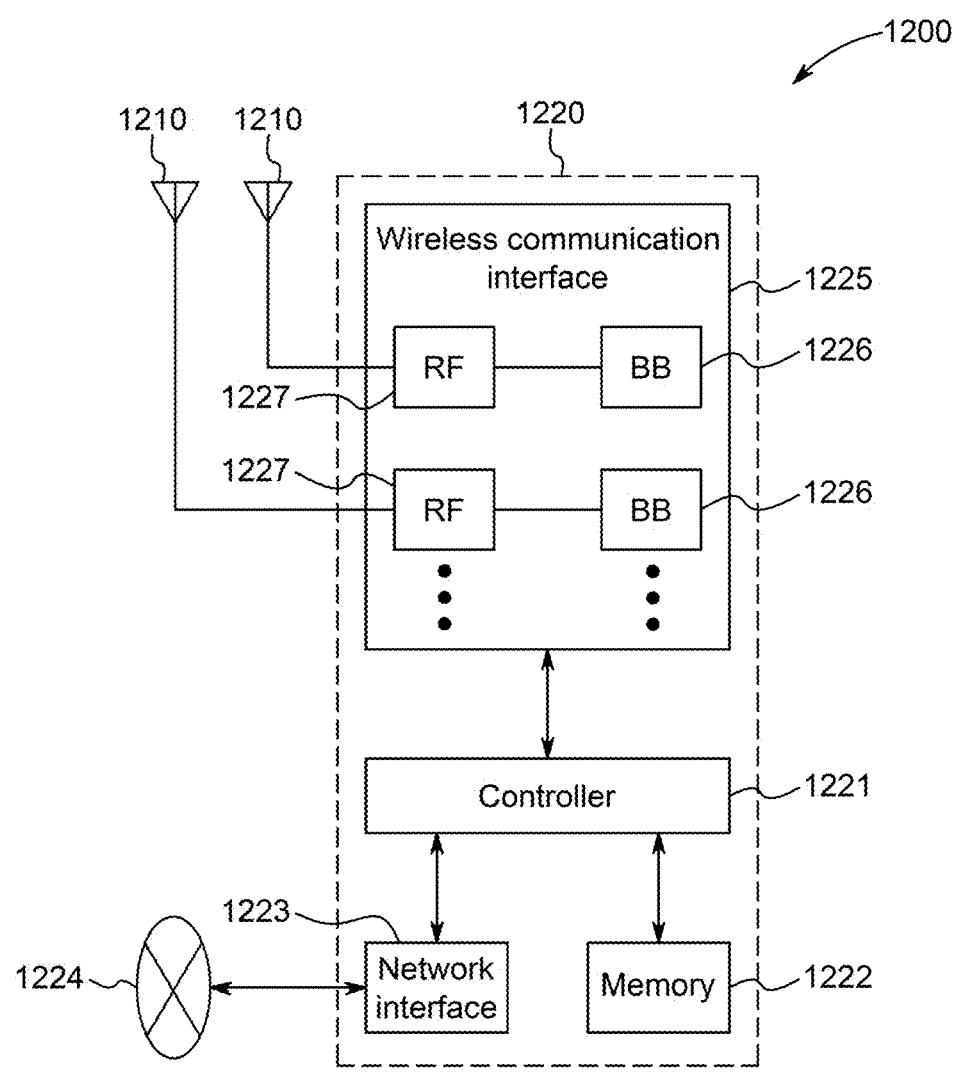
FIG. 12 is a block diagram showing a first example of a schematic configuration of an Evolved Node B (eNB)

FIG. 12 is a block diagram showing a first example of a schematic configuration of an eNB to which the technique of the disclosure may be applied. The eNB 1200 includes a single or multiple antennas 1210 and a base station device 1220. The base station device 1220 and each of the antennas 1210 may be connected via a RF cable.

Each of the antennas 1210 includes a single or multiple antenna elements (such as multiple antenna elements included in a multiple-input multiple-output (MIMO) antenna), and are used for transmitting and receiving wireless signals by the base station device 1220. The eNB 1200 may include the multiple antennas 1210, as shown in FIG. 12. For example, the multiple antennas 1210 may be compatible with multiple frequency bands used by the eNB 1200. Although FIG. 12 shows an example in which the eNB 1200 includes the multiple antennas 1210, the eNB 1200 may also include a single antenna 1210.

The base station device 1220 includes a controller 1221, a memory 1222, a network interface 1223, and a wireless communication interface 1225.

The controller 1221 may be, for example, a CPU or a DSP, and operates various functions of a higher layer of the base station device 1220. For example, the controller 1221 generates a data packet based on data in a signal processed by the wireless communication interface 1225, and transfers the generated packet via the network interface 1223. The controller 1221 may bundle data from multiple baseband processors to generate bundled packet, and transfer the generated bundled packet. The controller 1221 may have logical functions of performing control such as radio resource control, radio bearer control, mobility management, admission control, and scheduling. The control may be performed in conjunction with an adjacent eNB or a core network node. The memory 1222 includes RAM and ROM, and stores a program that is executed by the controller 1221, and various types of control data (such as a terminal list, transmitting power data, and scheduling data).

The network interface 1223 is a communication interface for connecting the base station device 1220 to a core network 1224. The controller 1221 may communicate with a core network node or another eNB via the network interface 1223. In that case, the eNB 1200, and the core network node or the other eNB may be connected to each other through a logical interface (such as an S1 interface and an X2 interface). The network interface 1223 may be a wired communication interface or a wireless communication interface for a wireless backhaul line. If the network interface 1223 is a wireless communication interface, the network interface 1223 may use a higher frequency band for wireless communication than a frequency band used by the wireless communication interface 1225.

The wireless communication interface 1225 supports any cellular communication scheme (such as Long Term Evolution (LTE) and LTE-Advanced), and provides wireless connection to a terminal positioned in a cell of the eNB 1200 via the antenna 1210. The wireless communication interface 1225 may typically include, for example, a baseband (BB) processor 1226 and an RF circuit 1227. The BB processor 1226 may perform, for example, coding/decoding, modulation/demodulation and multiplexing/de-multiplexing, and perform various types of signal processes of the layer (for example L1, media access control (MAC), radio link control (RLC) and packet data convergence protocol (PDCP)). Instead of the controller 1221, the BB processor 1226 may have a part or all of the above logical functions. The BB processor 1226 may be a memory storing communication control programs, or a module including a processor and a related circuit which are configured to execute the programs. Updating the program may allow the functions of the BB processor 1226 to be changed. The module may be a card or a blade that is inserted into a slot of the base station device 1220. Alternatively, the module may be a chip that is mounted on the card or the blade. In addition, the RF circuit 1227 may include, for example, a frequency mixer, a filter or an amplifier, and transmits and receives wireless signals via the antenna 1210.

As shown in FIG. 12, the wireless communication interface 1225 may include multiple BB processors 1226. For example, the multiple BB processors 1226 may be compatible with multiple frequency bands used by the eNB 1200. As shown in FIG. 12, the wireless communication interface 1225 may include multiple RF circuits 1227. For example, the multiple RF circuits 1227 may be compatible with multiple antenna elements. Although FIG. 12 shows an example in which the wireless communication interface 1225 includes multiple BB processors 1226 and multiple RF circuits 1227, the wireless communication interface 1225 may include a single BB processor 1226 and a single RF circuit 1227.

Second Application Example

Figure 13:
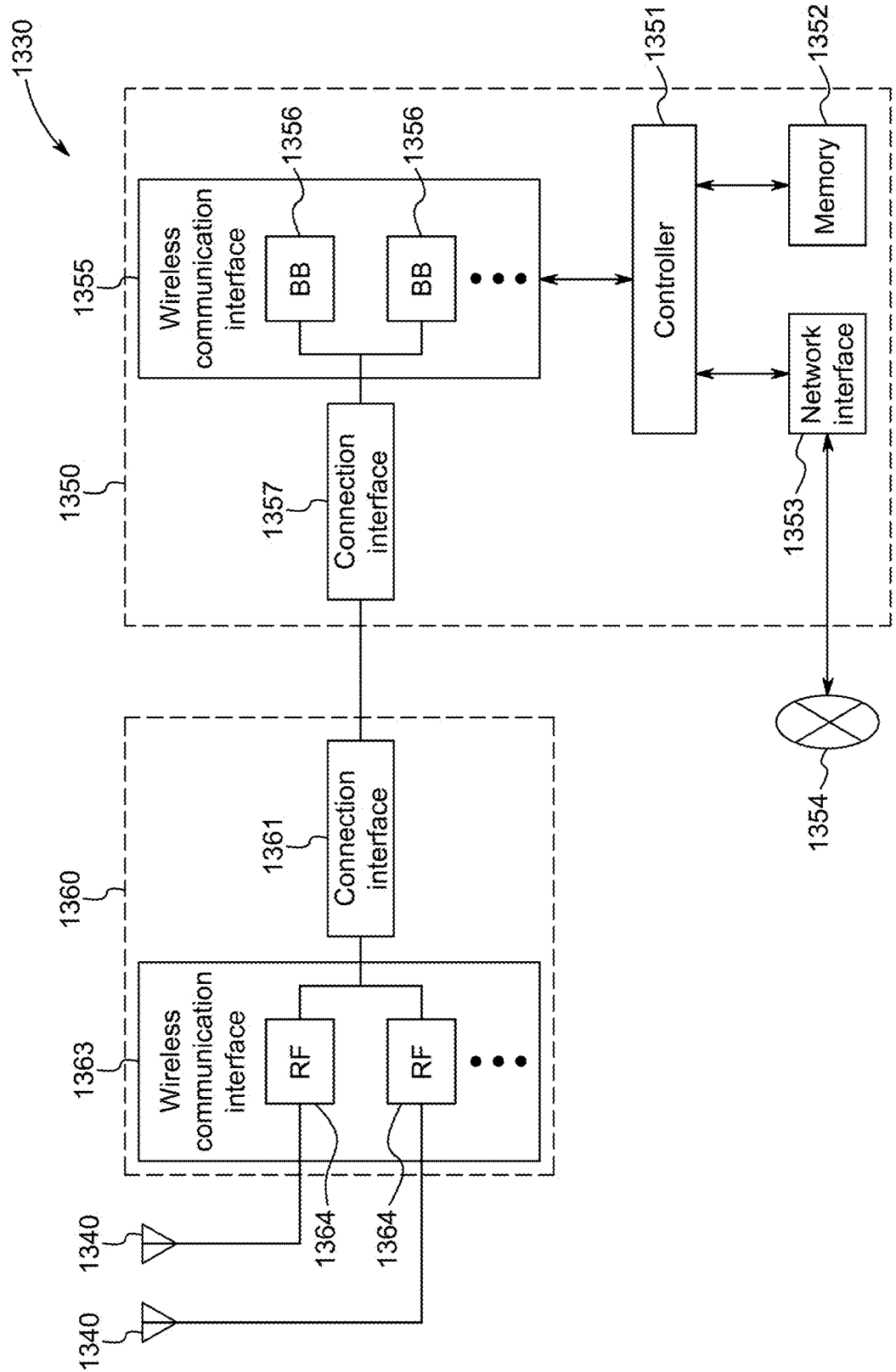
FIG. 13 is a block diagram showing a second example of a schematic configuration of an eNB.

FIG. 13 is a block diagram showing a second example of a schematic configuration of an eNB to which the technique of the present disclosure may be applied. An eNB 1330 includes a single or multiple antennas 1340, a base station device 1350 and an RRH 1360. Each antenna 1340 and the RRH 1360 may be connected to each other via an RF cable. The base station device 1350 and the RRH 1360 may be connected to each other via a high-speed line such as a fiber cable.

Each of the antennas 1340 includes a single or multiple antennal elements (such as multiple antenna elements included in a multiple-input multiple-output (MIMO) antenna), and is used for the RRH 1360 to transmit and receive wireless signals. As shown in FIG. 13, the eNB 1330 may include multiple antennas 1340. For example, the multiple antennas 1340 may be compatible with multiple frequency bands used by the eNB 1330. Although FIG. 13 shows an example that the eNB 1330 includes multiple antennas 1340, the eNB 1330 may also include a single antenna 1340.

The base station device 1350 includes a controller 1351, a memory 1352, a network interface 1353, a wireless communication interface 1355, and a connection interface 1357.

The controller 1351, the memory 1352, and the network interface 1353 are the same as the controller 1221, the memory 1222, and the network interface 1223 described with reference to FIG. 12.

The wireless communication interface 1355 supports any cellular communication solution (such as LTE and LTE-advanced), and provides wireless communication with a terminal located in a sector corresponding to the RRH 1360 via the RRH 1360 and the antenna 1340. The wireless communication interface 1355 may typically include, for example, a BB processor 1356. Other than connecting to an RF circuit 1364 of the RRH 1360 via the connection interface 1357, the BB processor 1356 is the same as the BB processor 1226 described with reference to FIG. 12. As show in FIG. 13, the wireless communication interface 1355 may include multiple BB processors 1356. For example, the multiple BB processors 1356 may be compatible with the multiple frequency bands used by the eNB 1330. Although FIG. 13 shows an example in which the wireless communication interface 1355 includes multiple BB processors 1356, the wireless communication interface 1355 may also include a single BB processor 1356.

The connection interface 1357 is an interface for connecting the base station device 1350 (the wireless communication interface 1355) to the RRH 1360. The connection interface 1357 may also be a communication module to connect the base station device 1350 (the wireless communication interface 1355) to the RRH 1360 for communication in the above high-speed line.

The RRH 1360 includes a connection interface 1361 and a wireless communication interface 1363.

The connection interface 1361 is an interface for connecting the RRH 1360 (the wireless communication interface 1363) to the base station device 1350. The connection interface 1361 may also be a communication module for the communication in the above high-speed line.

The wireless communication interface 1363 transmits and receives wireless signals via the antenna 1340. The wireless communication interface 1363 may typically include, for example, the RF circuit 1364. The RF circuit 1364 may include, for example, a frequency mixer, a filter and an amplifier, and transmits and receives wireless signals via the antenna 1340. The wireless communication interface 1363 may include multiple RF circuits 1364, as shown in FIG. 13. For example, the multiple RF circuits 1364 may support multiple antenna elements. Although FIG. 13 shows the example in which the wireless communication interface 1363 includes the multiple RF circuits 1364, the wireless communication interface 1363 may also include a single RF circuit 1364.

In the eNB 1200 shown in FIG. 12 and the eNB 1330 shown in FIG. 13, the generating unit 810 and the determining unit 830 described with reference to FIG. 8 may be implemented by the controller 1221 and/or the controller 1351. At least a part of the functions may be implemented by the controller 1221 and the controller 1351. For example, the controller 1221 and/or the controller 1351 may execute the functions of generating the information related to the TAG and determining to enable or disable the HARQ processes between the user equipment and all cells in the TAG by executing instructions stored in the corresponding memory.

[Application Example of the Terminal Device]

First Application Example

Figure 14:
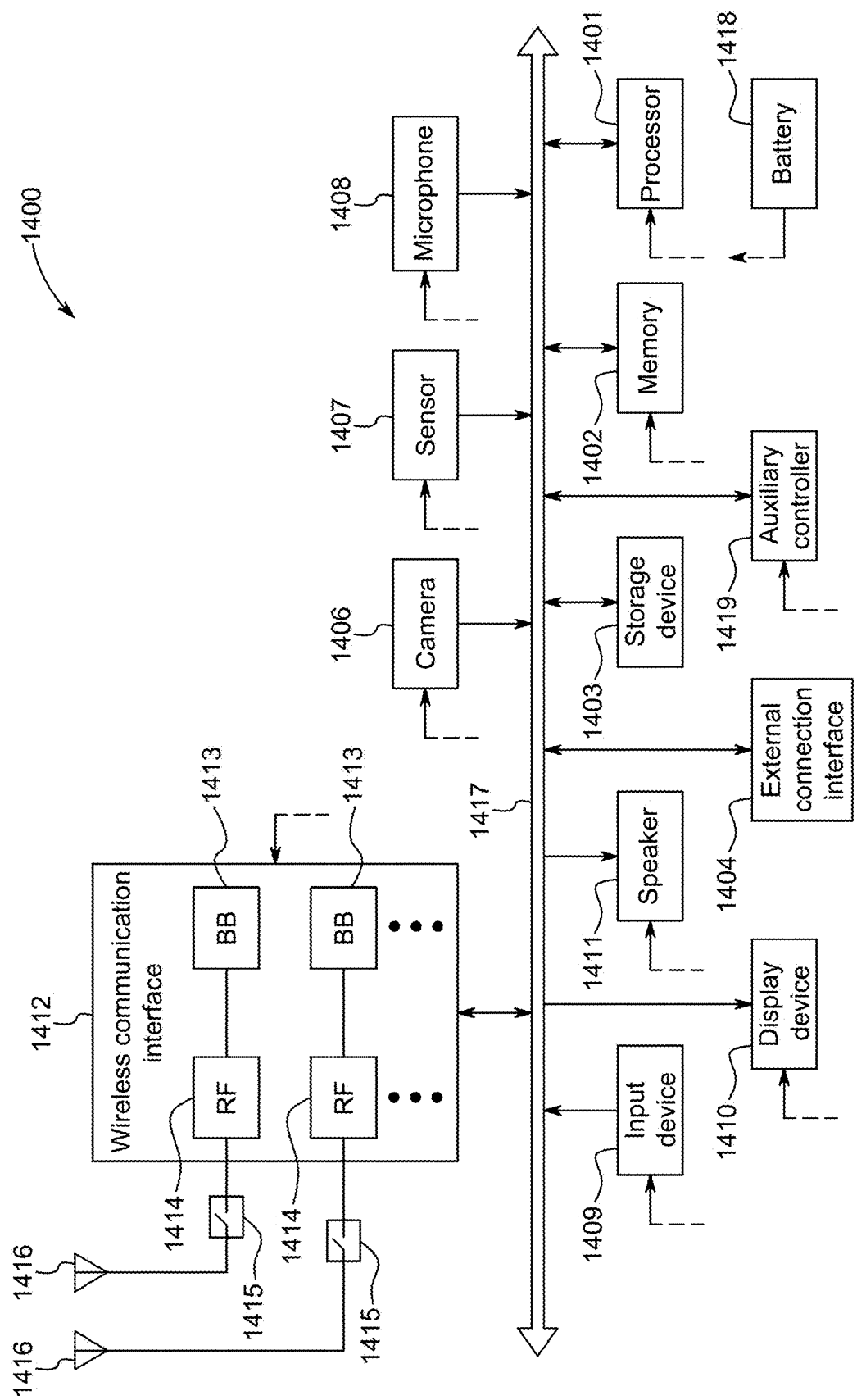
FIG. 14 is a block diagram showing an example of a schematic configuration of a smartphone.

FIG. 14 is a block diagram showing an example of a schematic configuration of a smartphone 1400 to which the technique of the present disclosure may be applied. The smartphone 1400 includes a processor 1401, a memory 1402, a storage device 1403, an external connection interface 1404, a camera 1406, a sensor 1407, a microphone 1408, an input device 1409, a display device 1410, a speaker 1411, a wireless communication interface 1412, a single or multiple antenna switches 1415, a single or multiple antennas 1416, a bus 1417, a battery 1418 and an auxiliary controller 1419.

The processor 1401 may be, for example, a CPU or a system on chip (SoC), and control functions of an application layer and other layers of the smartphone 1400. The memory 1402 includes an RAM and an ROM, and stores programs executed by the processor 1401 and data. The storage device 1403 may include a storage medium such as a semiconductor memory and a hard disk. The external connection interface 1404 is an interface for connecting an external device (such as a memory card and a universal serial bus (USB) device) to the smartphone 1400.

The camera 1406 includes an image sensor (such as a charge coupled device (CCD) and a complementary metal oxide semiconductor (CMOS)) and generates a captured image. The sensor 1407 may include a group of sensors such as a measurement sensor, a gyro sensor, a geomagnetic sensor, and an acceleration sensor. The microphone 1408 converts sounds that are inputted to the smartphone 1400 into audio signals. The input device 1409 includes, for example, a touch sensor configured to detect touch onto a screen of the display device 1410, a keypad, a keyboard, a button, or a switch, and receive an operation or information inputted from a user. The display device 1410 includes a screen such as a liquid crystal display (LCD) and an organic light-emitting diode (OLED) display, and displays an output image of the smartphone 1400. The speaker 1411 converts the audio signal that is outputted from the smartphone 1400 to sound.

The wireless communication interface 1412 supports any cellular communication scheme (such as LTE and LTE-Advanced), and performs wireless communications. The wireless communication interface 1412 may typically include, for example, a BB processor 1413 and an RF circuit 1414. The BB processor 1413 may perform for example coding/decoding, modulation/demodulation and multiplexing/de-multiplexing, and perform various types of signal processes for wireless communications. The RF circuit 1414 may include, for example, a frequency mixer, a filter and an amplifier, and transmits and receives wireless signals via the antenna 1416. The wireless communication interface 1412 may be a chip module having the BB processor 1413 and the RF circuit 1414 integrated thereon. As shown in FIG. 14, the wireless communication interface 1412 may include multiple BB processors 1413 and multiple RF circuits 1414. Although FIG. 14 shows an example in which the wireless communication interface 1412 includes multiple BB processors 1413 and multiple RF circuits 1414, the wireless communication interface 1412 may also include a single BB processor 1413 and a single RF circuit 1414.

Furthermore, in addition to the cellular communication scheme, the wireless communication interface 1412 may support another type of wireless communication scheme such as a short-range wireless communication scheme, a near field communication scheme, and a radio local area network (LAN) scheme. In this case, the wireless communication interface 1412 may include the BB processor 1413 and the RF circuit 1414 for each wireless communication scheme.

Each of the antenna switches 1415 switches connection destinations of the antennas 1416 among multiple circuits (such as circuits for different wireless communication schemes) included in the wireless communication interface 1412.

Each of the antennas 1416 includes a single or multiple antenna elements (such as the multiple antenna elements included in an MIMO antenna), and is used for the wireless communication interface 1412 to transmit and receive wireless signals. The smartphone 1400 may include the multiple antennas 1416, as shown in FIG. 14. Although FIG. 14 shows the example in which the smartphone 1400 includes the multiple antennas 1416, the smartphone 1400 may also include a single antenna 1416.

Furthermore, the smartphone 1400 may include the antenna 1416 for each wireless communication scheme. In this case, the antenna switch 1415 may be omitted from the configuration of the smartphone 1400.

The bus 1417 connects the processor 1401, the memory 1402, the storage device 1403, the external connection interface 1404, the camera 1406, the sensor 1407, the microphone 1408, the input device 1409, the display device 1410, the speaker 1411, the wireless communication interface 1412, and the auxiliary controller 1419 to each other. The battery 1418 supplies power to the various modules of the smartphone 1400 shown in FIG. 14 via a feeder line. The feeder line is partially shown as a dash line in FIG. 14. The auxiliary controller 1419 operates a minimum necessary function of the smartphone 1400, for example, in a sleep mode.

In the smartphone 1400 shown in FIG. 14, the determining unit 120 and the feedback unit 130 described with reference to FIG. 1 may be implemented by the processor 1401 or the auxiliary controller 1419. At least a part of the functions may be implemented by the processor 1401 or the auxiliary controller 1419. For example, the processor 1401 or the auxiliary controller 1419 may execute the functions of determining to enable or disable the HARQ processes with all cells in the TAG and feeding back ACK/NACK for downlink data by executing instructions stored in the memory 1402 or the storage device 1403.

Second Application Example

Figure 15:
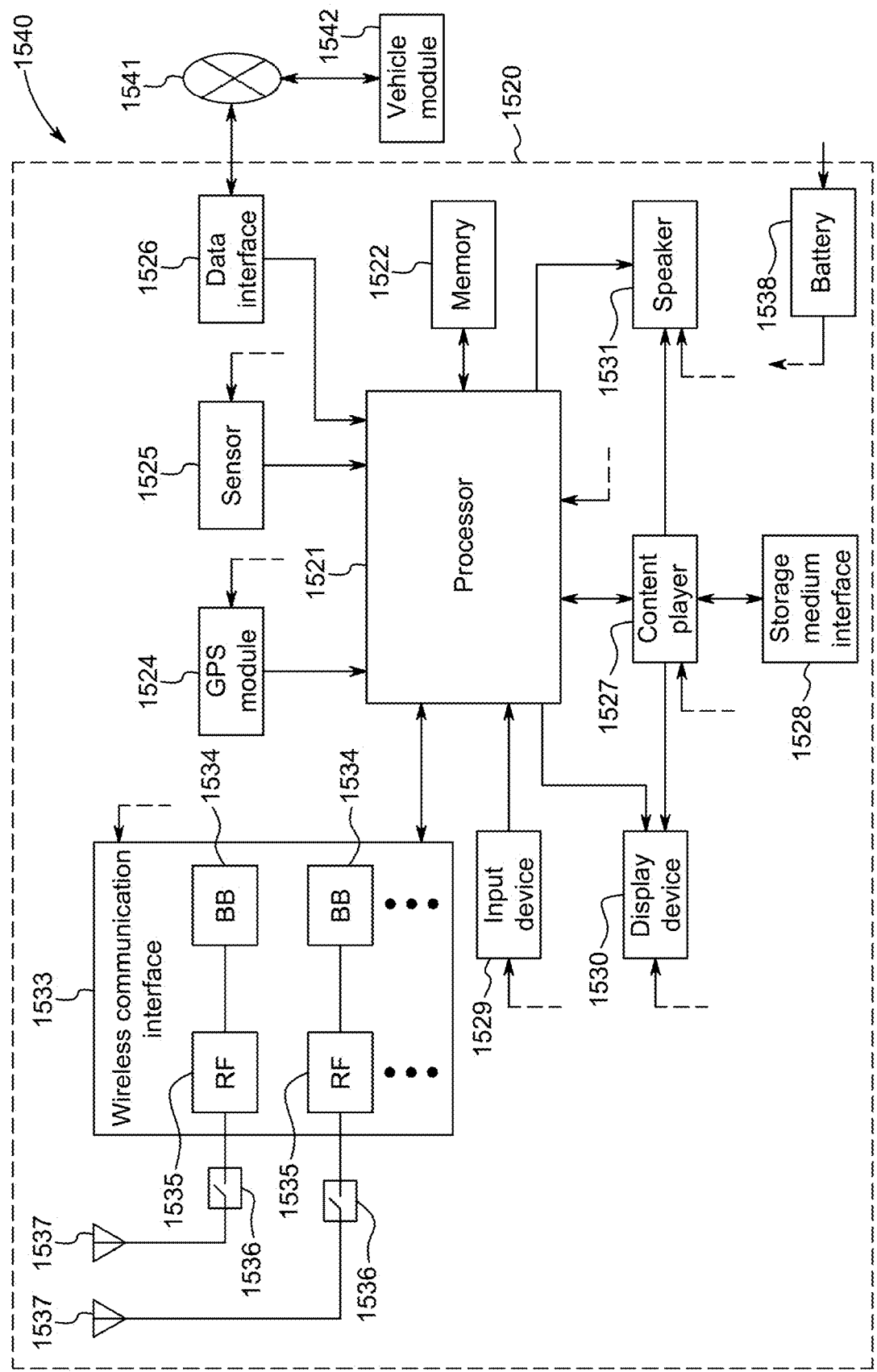
FIG. 15 is a block diagram showing an example of a schematic configuration of a car navigation device.

FIG. 15 is a block diagram showing an example of a schematic configuration of a car navigation device 1520 to which the technique of the present disclosure may be applied. The car navigation device 1520 includes a processor 1521, a memory 1522, a global positioning system (GPS) module 1524, a sensor 1525, a data interface 1526, a content player 1527, a storage medium interface 1528, an input device 1529, a display device 1530, a speaker 1531, a wireless communication interface 1533, a single or multiple antenna switches 1536, a single or multiple antennas 1537 and a battery 1538.

The processor 1521 may be, for example, a CPU or SoC, and controls the navigation function and additional functions of the car navigation device 1520. The memory 1522 includes an RAM and an ROM, and stores programs executed by the processor 1521 and data.

The GPS module 1524 measures a location of the car navigation device 1520 (such as a latitude, a longitude and a height) using a GPS signal received from a GPS satellite. The sensor 1525 may include a group of sensors such as a gyroscope sensor, a geomagnetic sensor and an air pressure sensor. The data interface 1526 is connected to, for example, an in-vehicle network 1541 via a terminal that is not shown, and obtains data generated by the vehicle (such as vehicle speed data).

The content player 1527 reproduces content stored in a storage medium (such as a CD and a DVD) that is inserted into the storage medium interface 1528. The input device 1529 includes, for example, a touch sensor configured to detect touch onto a screen of the display device 1530, a button, or a switch, and receives an operation or information inputted from a user. The display device 1530 includes a screen such as a LCD or an OLED display, and displays an image for the navigation function or reproduced content. The speaker 1531 outputs sounds for the navigation function or the reproduced content.

The wireless communication interface 1533 supports any cellular communication scheme (such as LTE and LTE-advanced), and performs wireless communications. The wireless communication interface 1533 may typically include, for example, a BB processor 1534 and an RF circuit 1535. The BB processor 1534 may perform, for example, coding/decoding, modulating/demodulating and multiplexing/de-multiplexing, and perform various types of signal processes for wireless communications. The RF circuit 1535 may include, for example, a frequency mixer, a filter and an amplifier, and transmits and receives wireless signals via the antenna 1537. The wireless communication interface 1533 may also be a chip module having the BB processor 1534 and the RF circuit 1535 integrated thereon. As shown in FIG. 15, the wireless communication interface 1533 may include multiple BB processors 1534 and multiple RF circuits 1535. Although FIG. 15 shows the example in which the wireless communication interface 1533 includes the multiple BB processors 1534 and the multiple RF circuits 1535, the wireless communication interface 1533 may include a single BB processor 1534 or a single RF circuit 1535.

Furthermore, in addition to a cellular communication scheme, the wireless communication interface 1533 may support another type of wireless communication scheme such as a short-range wireless communication scheme, a near field communication scheme, and a wireless LAN scheme. In this case, the wireless communication interface 1533 may include the BB processor 1534 and the RF circuit 1535 for each wireless communication scheme.

Each of the antenna switches 1536 switches connection destinations of the antenna 1537 among multiple circuits (such as circuits for different wireless communication schemes) included in the wireless communication interface 1533.

Each of the antennas 1537 includes a single or multiple antenna elements (such as the multiple antenna elements included in a MIMO antenna) and is used for the wireless communication interface 1533 to transmit and receive wireless signals. The car navigation device 1520 may include multiple antennas 1537, as shown in FIG. 15. Although FIG. 15 shows the example in which the car navigation device 1520 includes the multiple antennas 1537, the car navigation device 1520 may include a single antenna 1537.

Furthermore, the car navigation device 1520 may include the antenna 1537 for each wireless communication scheme. In this case, the antenna switch 1536 may be omitted from the configuration of the car navigation device 1520.

The battery 1538 supplies power to the various modules of the car navigation device 1520 shown in FIG. 15 via feeder lines that are partially shown as dashed lines in FIG. 15. The battery 1538 accumulates power supplied from the vehicle.

In the car navigation device 1520 shown in FIG. 15, the determining unit 120 and the feedback unit 130 described with reference to FIG. 1 may be implemented by the processor 1521. At least a part of the functions may be implemented by the processor 1521. For example, the processor 1521 may execute the functions of determining to enable or disable the HARQ processes with all cells in the TAG and feeding back ACK/NACK for downlink data by executing instructions stored in the memory 1522.

The technique of the disclosure may also be implemented as an in-vehicle system (or a vehicle) 3540 including one or more of the car navigation device 1520, an in-vehicle network 1541 and a vehicle module 1542. The vehicle module 1542 generates vehicle data (such as a vehicle speed, a motor speed and fault information), and outputs the generated data to the in-vehicle network 1541.

The preferred embodiments of the present disclosure are described above with reference to the drawings, but the present disclosure is not limited to the above examples. Those skilled in the art may make various alternations and modifications within the scope of the claims, and it should be understood that these alternations and modifications shall naturally fall within the technical scope of the present disclosure.

For example, a unit shown by a dashed box in the functional block diagram shown in the drawings indicates that the functional unit is optional in the corresponding device, and each optional functional unit may be combined in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Further, such configuration is included in the technical scope of the present disclosure.

In this specification, the steps described in the flowchart include not only processes performed in time series as the order described, but also processes performed in parallel or individually instead of having to be performed in time series. Further, even in the steps processed in time series, the order can be appropriately changed.

Although the embodiments of the present disclosure have been described above in detail in connection with the drawings, it is appreciated that the embodiments as described above are merely illustrative rather than limitative for the present disclosure. Those skilled in the art may make various modifications and variations to the above embodiments without departing from the spirit and scope of the disclosure. Therefore, the scope of the disclosure is defined merely by the appended claims and their equivalents.

The invention claimed is:

1. An electronic equipment, comprising processing circuitry configured to:
   receive, from a network side equipment serving the electronic equipment, information related to a Timing Advance Group (TAG); and
   enable or disable Hybrid Automatic Repeat Request (HARQ) processes between the electronic equipment and all cells in the TAG according to the information related to the TAG,
   wherein the information related to the TAG comprises a Timing Advance Command (TAC) related to the TAG, and the processing circuitry is further configured to:
   determine a value of a Timing Advance (TA) according to the TAC; and
   perform a process for enabling or disabling the HARQ processes between the electronic equipment and all cells in the TAG according to the value of the TA,
   wherein the process for enabling or disabling the HARQ processes between the electronic equipment and all cells in the TAG comprises:
   when the value of the TA is greater than a predetermined threshold of the TA, disabling the HARQ processes between the electronic equipment and all cells in the TAG; and
   when the value of the TA is not greater than the predetermined threshold of the TA, enabling the HARQ processes between the electronic equipment and all cells in the TAG.

2. The electronic equipment according to claim 1, wherein the predetermined threshold of the TA is an appointed value between the network side equipment and the electronic equipment, or
   wherein the processing circuitry is further configured to:
   receive the predetermined threshold of the TA from the network side equipment.

3. The electronic equipment according to claim 1, wherein the information related to the TAG comprises configuration information of the TAG, and the process for enabling or disabling the HARQ processes between the electronic equipment and all cells in the TAG comprises:
   enabling or disabling the HARQ processes between the electronic equipment and all cells in the TAG according to information in the configuration information of the TAG which is related to enabling or disabling of the HARQ processes.

4. The electronic equipment according to claim 1, wherein the processing circuitry is further configured to:
   in the case of enabling the HARQ processes between the electronic equipment and all cells in the TAG, when data is received from network side equipment of a cell in the TAG, feed ACK or NACK back to the network side equipment; and
   in the case of disabling the HARQ processes between the electronic equipment and all cells in the TAG, when data is received from network side equipment of a cell in the TAG, not feed ACK or NACK back to the network side equipment.

5. The electronic equipment according to claim 1, wherein the processing circuitry is further configured to:
   receive, from the network side equipment, updated information related to the TAG, after enabling or disabling the HARQ processes between the electronic equipment and all cells in the TAG; and
   enable or disable the HARQ processes between the electronic equipment and all cells in the TAG according to the updated information related to the TAG.

6. The electronic equipment according to claim 1, wherein the processing circuitry is further configured to:
   receive, from the network side equipment, information related to a specific HARQ process, after enabling or disabling the HARQ processes between the electronic equipment and all cells in the TAG; and
   enable or disable the specific HARQ process according to the information related to the specific HARQ process.

7. An electronic equipment, comprising processing circuitry configured to:
   perform a process for determining to enable or disable Hybrid Automatic Repeat Request (HARQ) processes between a user equipment and all cells in a Timing Advance Group (TAG) according to a value of a Timing Advance (TA) that is identical between the user equipment and all cells in the TAG;
   generate information related to the TAG of a user equipment served by the electronic equipment; and transmit the information related to the TAG to the user equipment to instruct the user equipment to enable or disable Hybrid Automatic Repeat Request (HARQ) processes between the user equipment and all cells in the TAG, wherein the process for determining to enable or disable the HARQ processes between the user equipment and all cells in the TAG comprises:

when the value of the TA is greater than a predetermined threshold of the TA, determining to disable the HARQ processes between the user equipment and all cells in the TAG; and when the value of the TA is not greater than the predetermined threshold of the TA, determining to enable the HARQ processes between the user equipment and all cells in the TAG.

8. The electronic equipment according to claim 7, wherein the information related to the TAG comprises a Timing Advance Command TAC related to the TAG.

9. The electronic equipment according to claim 7, wherein the information related to the TAG comprises configuration information of the TAG, and the configuration information of the TAG comprises information related to the enabling or disabling of the HARQ processes.

10. The electronic equipment of claim 9, wherein the processing circuitry is further configured to:
transmit the information related to the TAG by high layer signaling.

11. The electronic equipment according to claim 10, wherein the high layer signaling comprises radio resource control (RRC) information, and the configuration information of the TAG comprises TAG-Config information element information.

12. The electronic equipment according to claim 11, wherein a timeAlignmentTimer field in the TAG-Config information element information is used to instruct to enable or disable the HARQ processes between the user equipment and all cells in the TAG.

13. The electronic equipment of claim 7, wherein the processing circuitry is further configured to:
update the information related to the TAG of the user equipment; and transmit the updated information to the user equipment to instruct the user equipment to disable or enable the HARQ processes between the user equipment and all cells in the TAG.

14. The electronic equipment according to claim 7, wherein the processing circuitry is further configured to:
after the HARQ processes between the electronic equipment and all cells in the TAG are enabled or disabled, determine to enable or disable a specific HARQ process among the HARQ processes between the user equipment and all cells in the TAG; and transmit information related to the specific HARQ process to the user equipment to instruct the user equipment to enable or disable the specific HARQ process.

15. A wireless communication method performed by an electronic equipment, comprising;
receiving, from a network side equipment serving the electronic equipment, information related to a Timing Advance Group (TAG);

enabling or disabling Hybrid Automatic Repeat Request (HARQ) processes between the electronic equipment and all cells in the TAG according to the information related to the TAG, wherein the information related to the TAG comprises a Timing Advance Command (TAC) related to the TAG;

determining a value of a Timing Advance (TA) according to the TAC; and enabling or disabling the HARQ processes between the electronic equipment and all cells in the TAG according to the value of the TA, wherein the enabling or disabling comprises:
when the value of the TA is greater than a predetermined threshold of the TA, disabling the HARQ processes between the electronic equipment and all cells in the TAG; and when the value of the TA is not greater than the predetermined threshold of the TA, enabling the HARQ processes between the electronic equipment and all cells in the TAG.

* * * * *